United States Patent [19]

Glaser

[11] E Re. 29,543

[45] Reissued Feb. 21, 1978

[54] ELEVATOR CONTROL SYSTEM

[75] Inventor: William Frank Glaser, Eastchester, N.Y.

[73] Assignee: Otis Elevator Company, New York, N.Y.

[21] Appl. No.: 631,288

[22] Filed: Nov. 12, 1975

Related U.S. Patent Documents

Reissue of:

[64] Patent No.: 3,412,826
Issued: Nov. 26, 1968
Appl. No.: 249,977
Filed: Jan. 3, 1963

U.S. Applications:

[63] Continuation of Ser. No. 92,549, Nov. 24, 1970, which is a continuation of Ser. No. 304,163, Aug. 13, 1952, abandoned.

[51] Int. Cl.[2] ..... B66B 1/18
[52] U.S. Cl. ..... 187/29 R
[58] Field of Search ..... 187/29

[56] References Cited

U.S. PATENT DOCUMENTS

| | | | |
|---|---|---|---|
| 1,904,647 | 4/1933 | Lindquist | 187/29.84 |
| 1,953,115 | 4/1934 | Lewis | 187/29.8 |
| 1,962,609 | 6/1934 | Gale | 187/29.3 |
| 2,100,176 | 11/1937 | Waters et al. | 187/29 |
| 2,468,317 | 4/1949 | Watson | 187/29 |
| 2,510,871 | 6/1950 | Di Giovanni | 187/29 |
| 2,589,242 | 3/1952 | Glaser et al. | 187/29 |
| 2,619,592 | 11/1952 | Paulson et al. | 187/29 |
| 2,642,158 | 6/1953 | Eames | 187/29 |
| 2,682,318 | 6/1954 | Glaser et al. | 187/29 |
| 2,688,383 | 11/1954 | Eames | 187/29 |
| 2,717,056 | 11/1955 | Santini et al. | 187/29 |
| 2,740,495 | 4/1956 | Santini et al. | 187/29 |
| 2,740,496 | 4/1956 | Santini et al. | 187/29 |
| 2,833,376 | 5/1958 | Burgy | 187/29 |

*Primary Examiner*—Robert K. Schaefer
*Assistant Examiner*—W. E. Duncanson, Jr.
*Attorney, Agent, or Firm*—Robert T. Mayer

[57] ABSTRACT

*An elevator control system for a group of cars in which the control of the cars is transferred in response to traffic conditions from a mode of operation in which the cars are successively started from a terminal in response to the generation of timed dispatching signals to one in which they are started in response to the registration of calls. During the latter mode of operation the cars are distributed throughout that portion of the building they serve whereby one car is parked at the top terminal, one at a landing called the middle free car parking floor and the remainder at the bottom terminal. In these circumstances, the top terminal car serves calls at that landing, the middle free car serves calls at landings between the bottom and top terminals and one of the bottom terminal cars serves calls at that landing and at any basements below it.*

*The cars are capable of high and low call reversal at any landing and the assignment of the cars as middle free car and active bottom car can be transferred if the active bottom car travels above a certain landing.*

43 Claims, 13 Drawing Figures

WILLIAM FRANK GLASER INVENTOR

BY J. L. Sharon ATTORNEY

WILLIAM FRANK GLASER INVENTOR

BY J. L. Sharon ATTORNEY

WILLIAM FRANK GLASER INVENTOR

BY J. L. Sharon ATTORNEY

WILLIAM FRANK GLASER INVENTOR

BY J. L. Sharon ATTORNEY

WILLIAM FRANK GLASER INVENTOR

BY J. L. Sharon ATTORNEY

WILLIAM FRANK GLASER INVENTOR

BY S. L. Sharon ATTORNEY

WILLIAM FRANK GLASER INVENTOR

BY J. L. Sharon ATTORNEY

WILLIAM FRANK GLASER INVENTOR

BY J. L. Sharon ATTORNEY

WILLIAM FRANK GLASER INVENTOR

BY J. L. Sharon ATTORNEY

WILLIAM FRANK GLASER INVENTOR

BY J. L. Sharon ATTORNEY

WILLIAM FRANK GLASER INVENTOR

BY J. L. Sharon ATTORNEY

WILLIAM FRANK GLASER INVENTOR

BY J. L. Sharon ATTORNEY

ELEVATOR CONTROL SYSTEM

Figure 1:
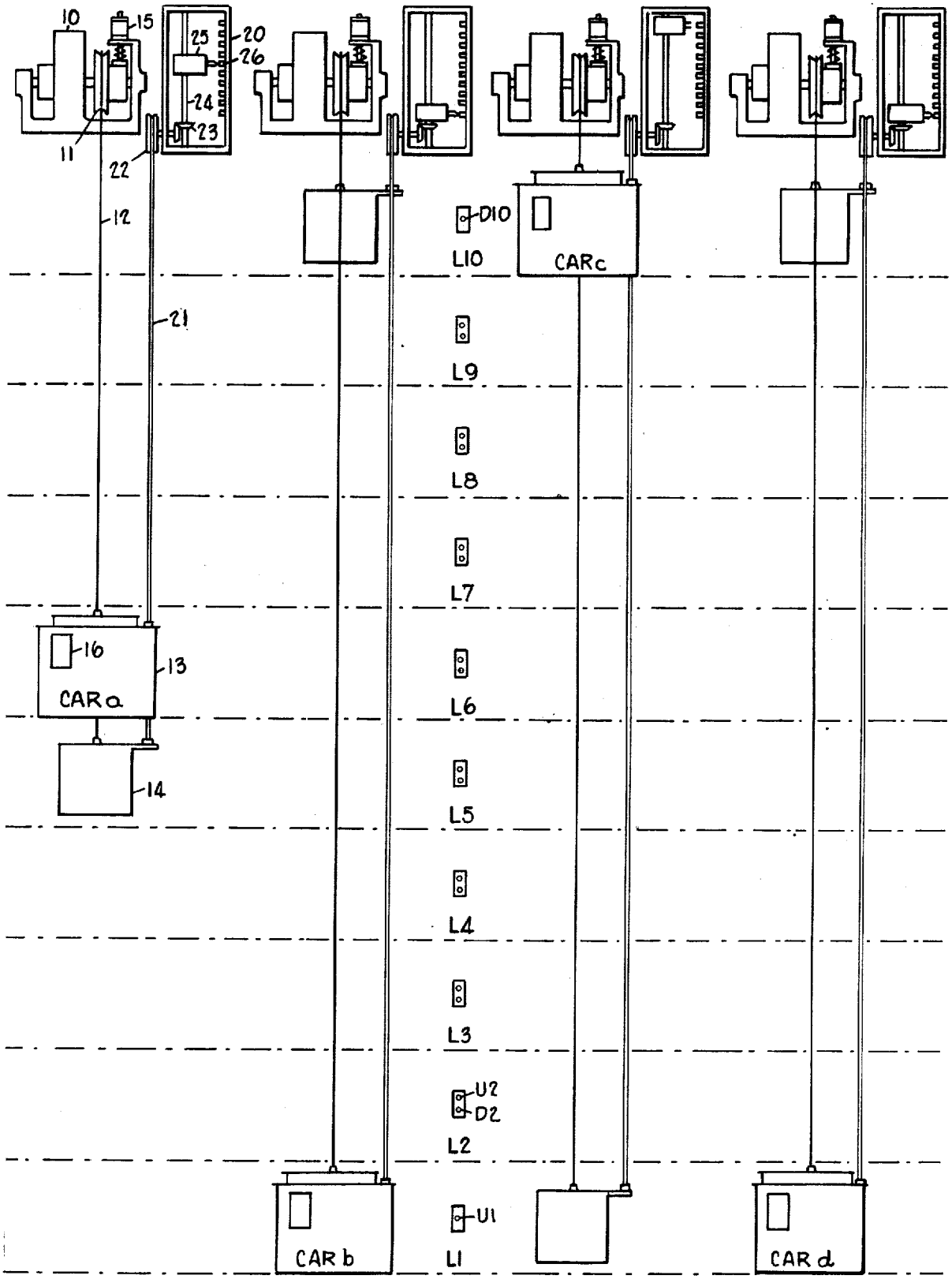

Matter enclosed in heavy brackets [ ] appears in the original patent but forms no part of this reissue specification; matter printed in italics indicates the additions made by reissue.

[The invention described in this application relates to control systems for elevators and this application is a continuation of my earlier application Ser. No. 304,163, filed Aug. 13, 1952 now abandoned.]

*The invention described in this application relates to control systems for elevators and this application is a continuation of reissue application Ser. No. 92,549 filed Nov. 24, 1970 seeking to reissue U.S. Letters Patent 3,412,826 granted on application Ser. No. 249,977 filed Jan. 3, 1963 which was a continuation of application Ser. No. 304,163 filed Aug. 13, 1952.*

The invention is directed primarily to elevator systems in which the cars are operated without attendants, although they may be arranged so that the cars may be operated at certain times with starting under the control of attendants. When operated without attendants, the cars are both started and stopped automatically, the stopping being effected in response to calls registered by passengers and intending passengers themselves. There are certain advantages, especially under certain conditions, in effecting the starting of the cars as well as stopping in response to the calls that are registered. Such systems are known as "collective control" systems. It is the usual practice in "collective control" installations of the multiplex type, i.e., of two or more elevators, to cause landing calls to be responded to by one of the cars, but to bring one or more additional cars into operation when certain service demand conditions arise. The invention is especially directed to a system for increasing in response to service demands the number of cars in operation.

One feature of the invention is to throw over the system to dispatching, that is automatic starting of the cars on a time basis, when predetermined service demand conditions arise.

This is of advantage in that economical service is provided so long as the service demand in light but that when the demand increases, more cars are provided to answer calls with the cars spaced on a time basis to insure good service.

When operating under dispatching, the number of cars in service may vary. Also, due to changing traffic conditions, the cars may be early or late in completing their round trips. Another feature of the invention is to automatically adjust the timing interval in accordance with the number of cars in service or to increase it when a car is late in completing a round trip and decrease it when it is early.

In carrying out the invention according to the preferred arrangement, the system is operated on an "on call" basis when traffic demand is light and on a "continuous call" basis when the demand is heavy. Under on call operation, one of the cars serves as a free car and parks at an intermediate floor. The other cars park at the terminals, one of them at the bottom terminal serving as the active bottom car and taking care of incoming traffic. So long as "on call" conditions exist, the free car responds to all landing calls until the active bottom car is started in operation by a car call whereupon it assists the free car in responding to landing calls.

When traffic demand conditions warrant, the cars are automatically thrown over to dispatching, being dispatched on a time basis on both up and down trips. When all calls are responded to, the cars automatically return to "on call" operation. In effecting this changeover, a car already at the bottom terminal or, if none, the car first to arrive is selected as the free car and goes to its middle free car parking floor. The next car at the bottom terminal becomes the active bottom car. Of the remaining cars, one of them is then caused to go to the top terminal as the inactive top car and the remaining car or cars are returned to the bottom terminal as inactive bottom cars.

Other features and advantages of the invention will become apparent from the above statements and from the following description and appended claims.

Figure 2:
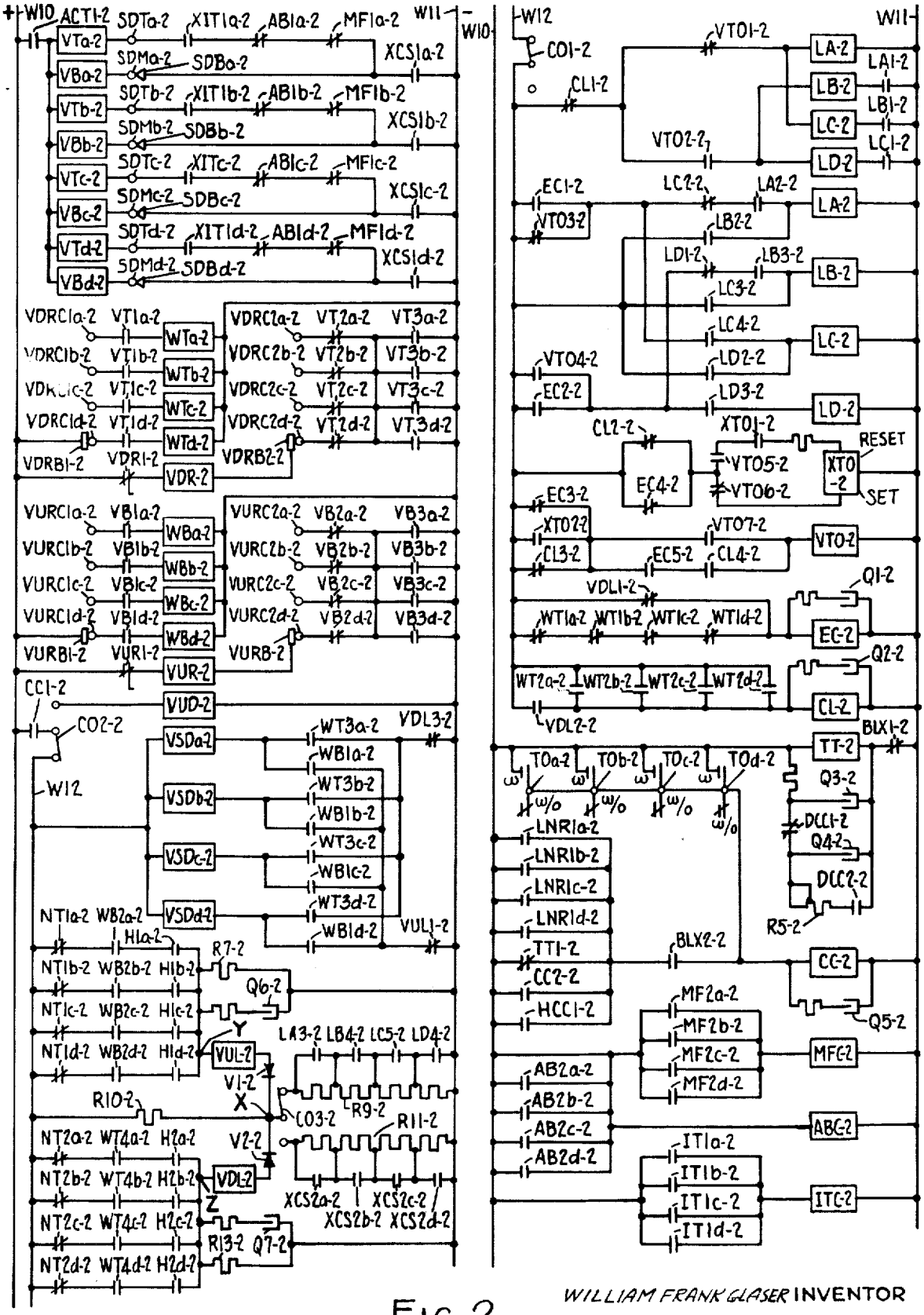
Figure 3:
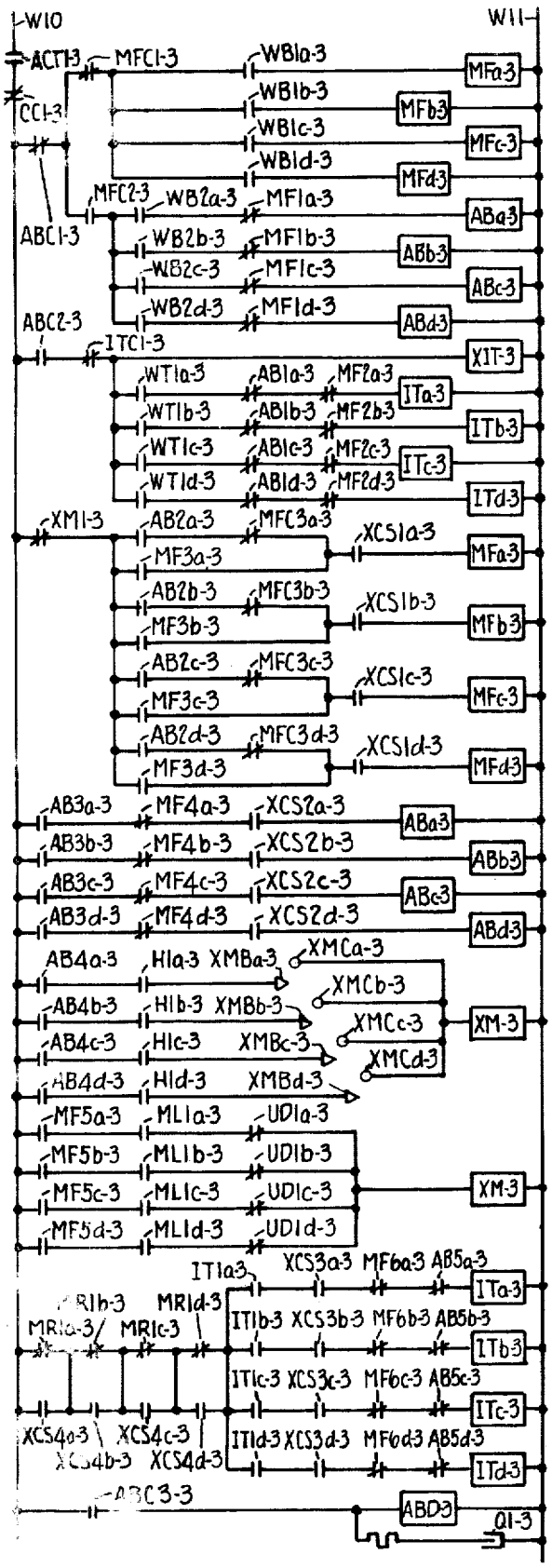
Figure 4:
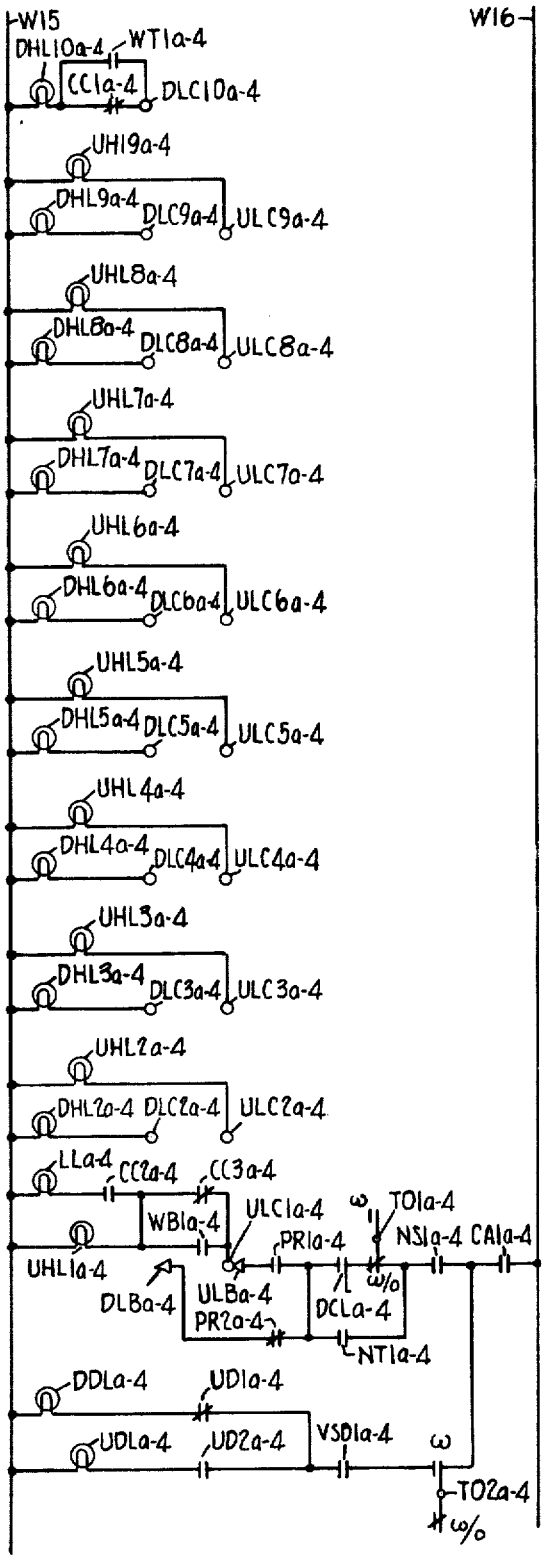
Figure 5:
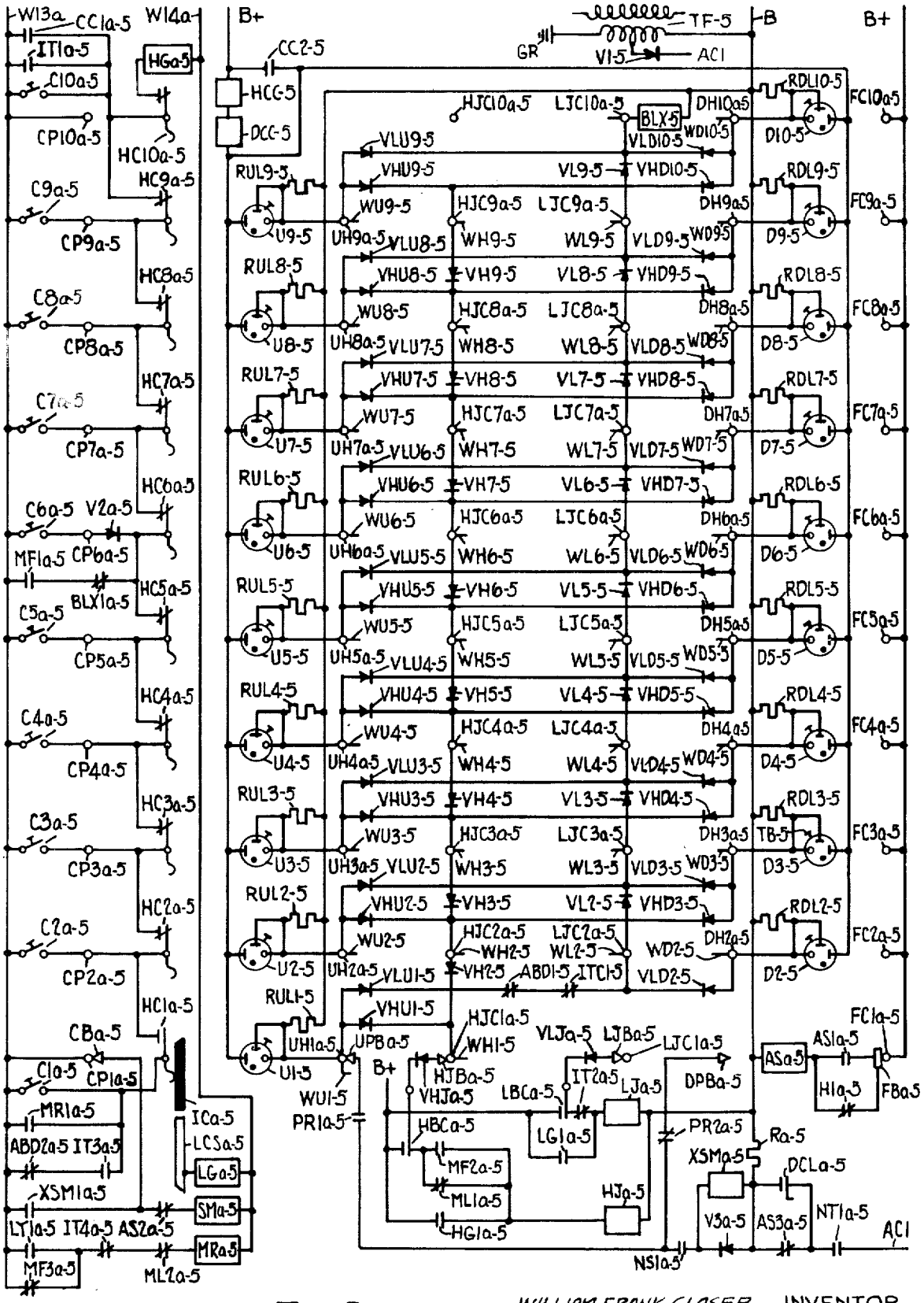
Figure 6:
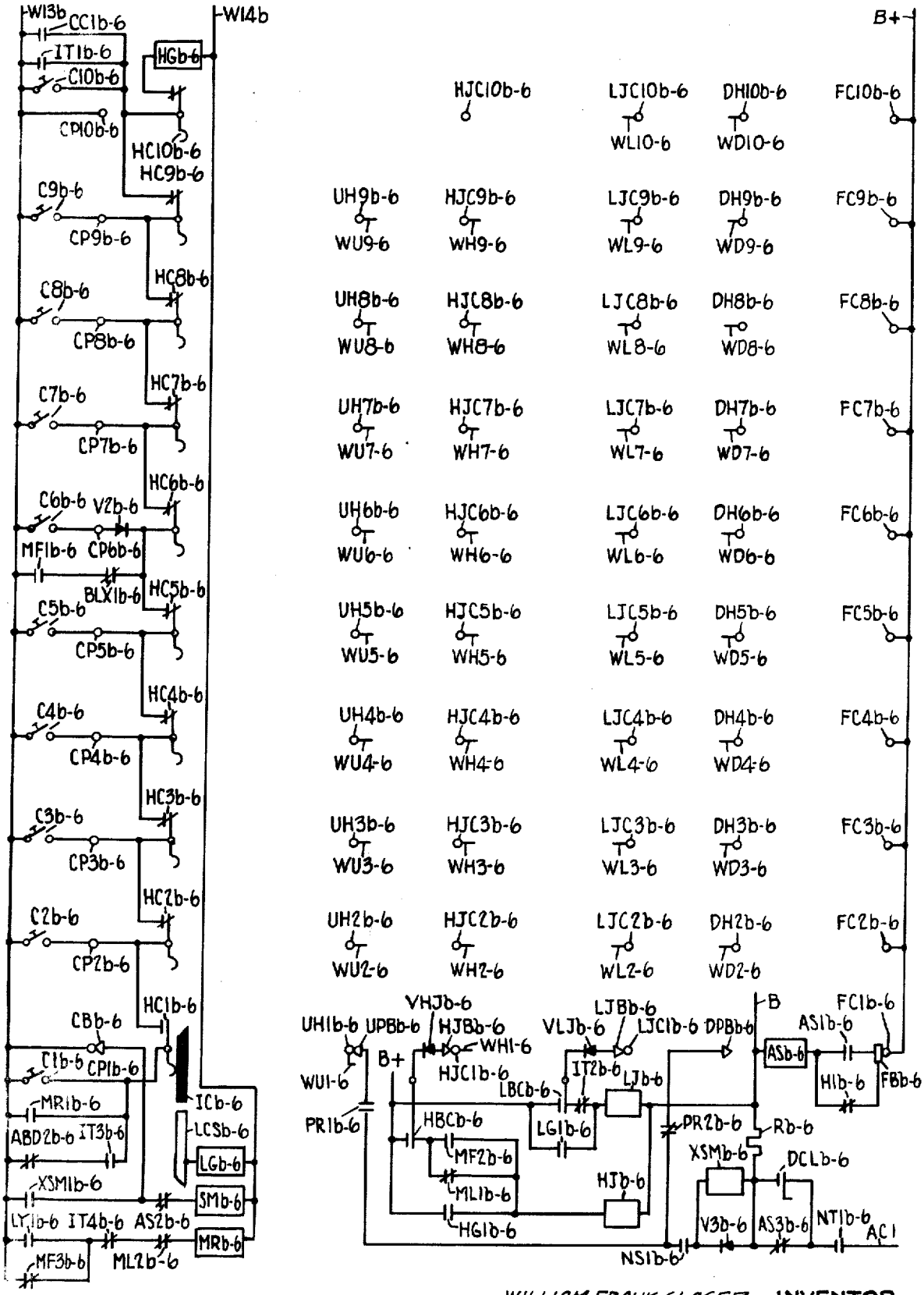
Figure 7:
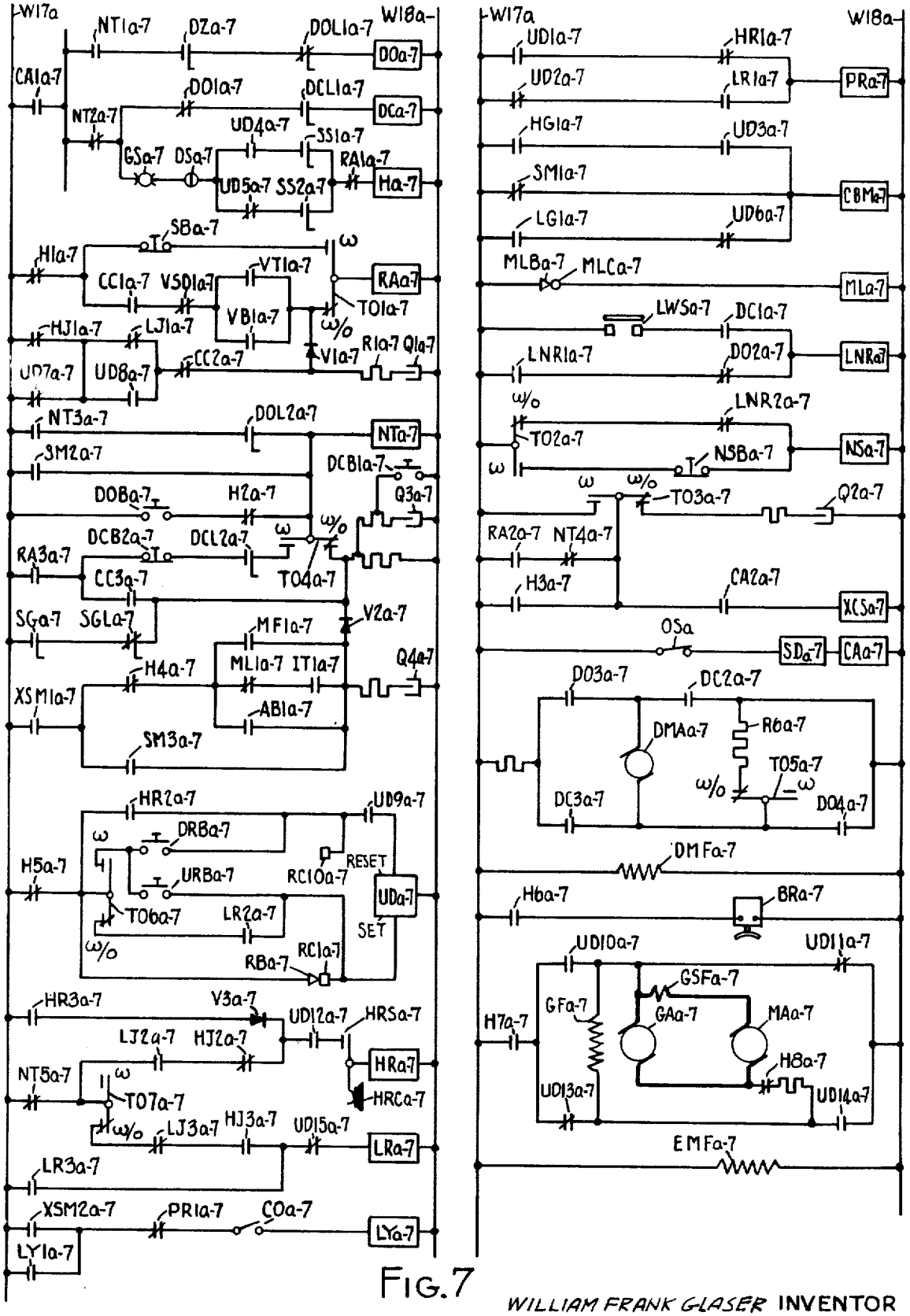
Figure 8:
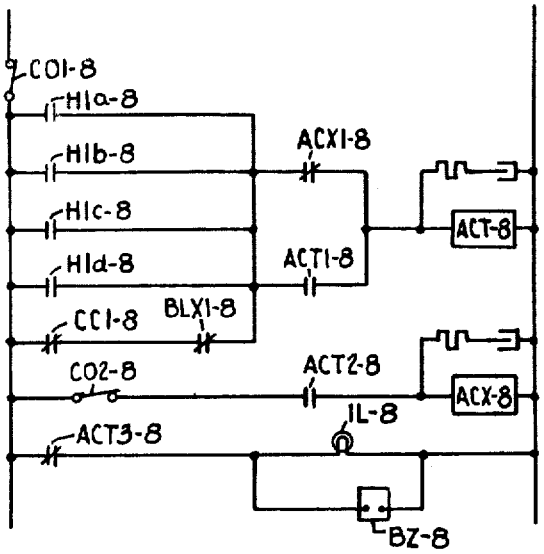
Figure 9A:
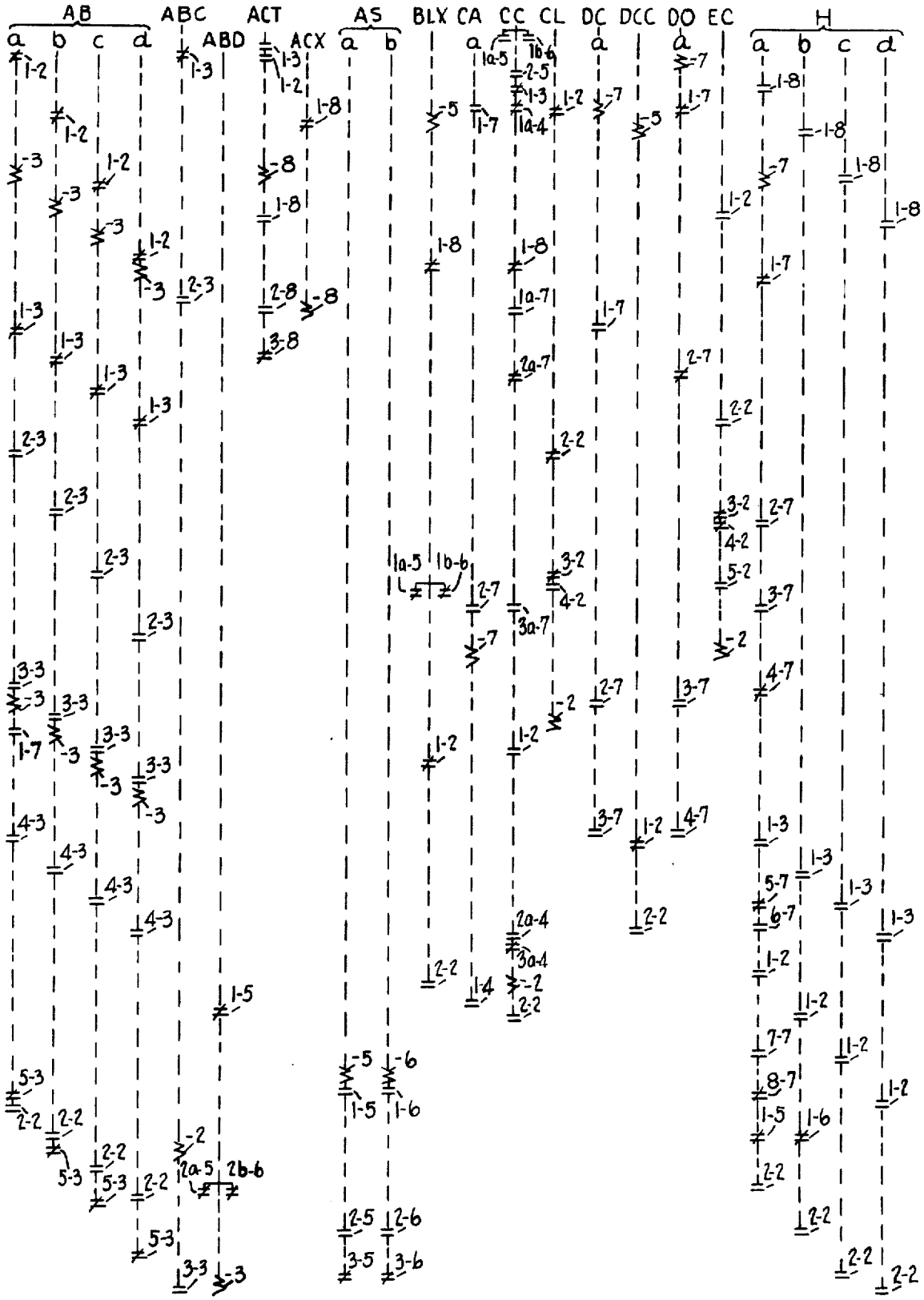
Figure 9B:
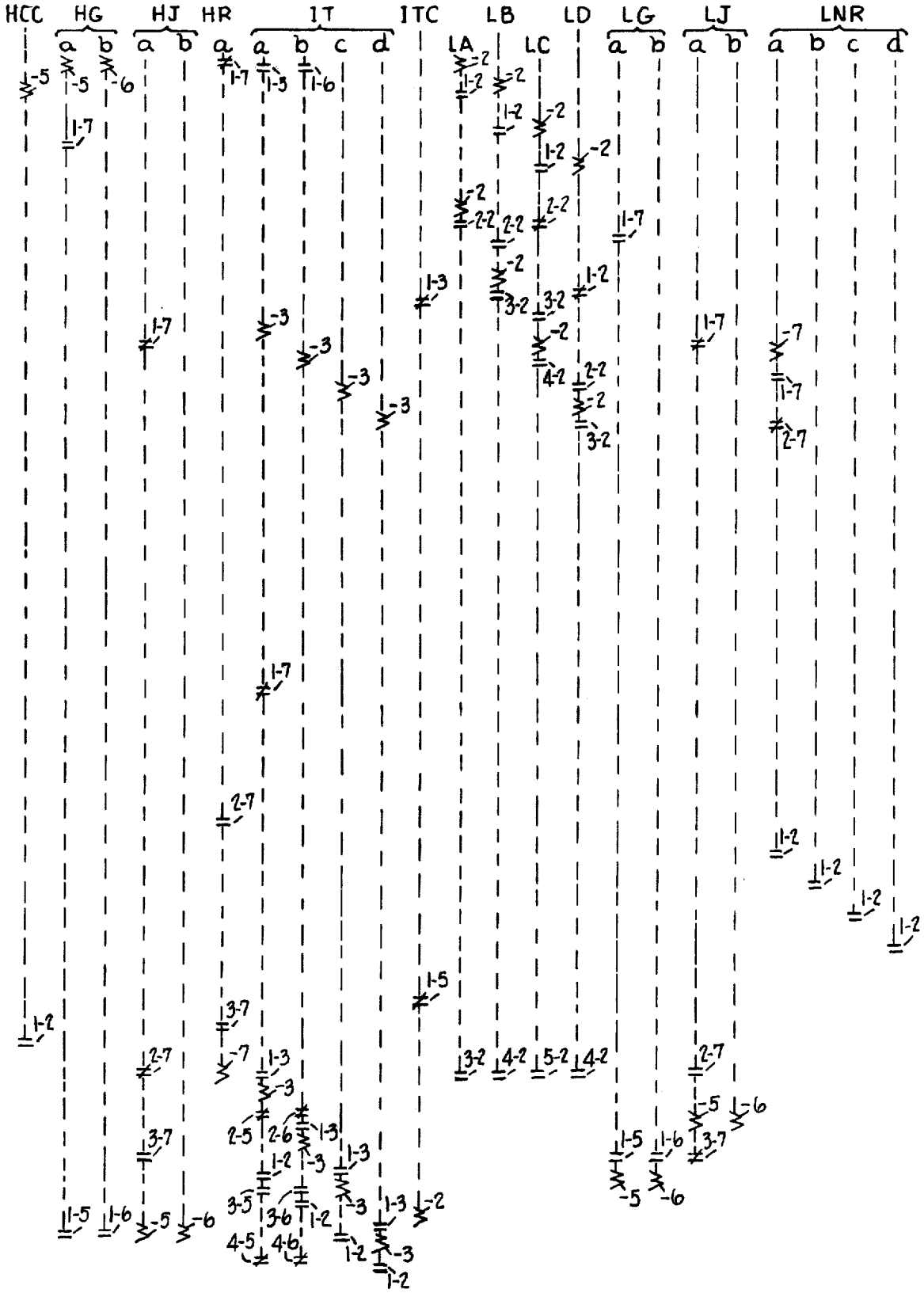
Figure 9C:
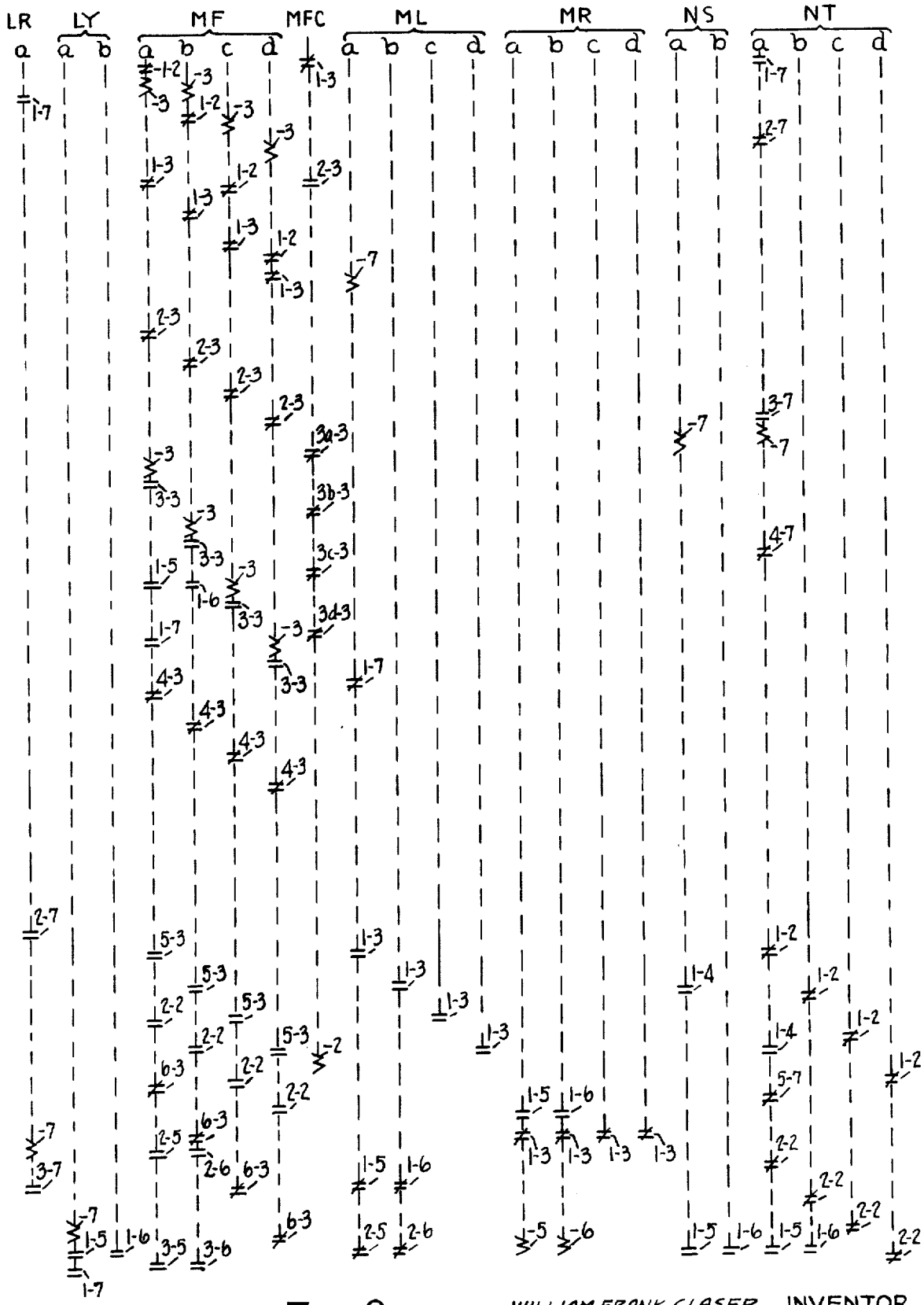
Figure 9D:
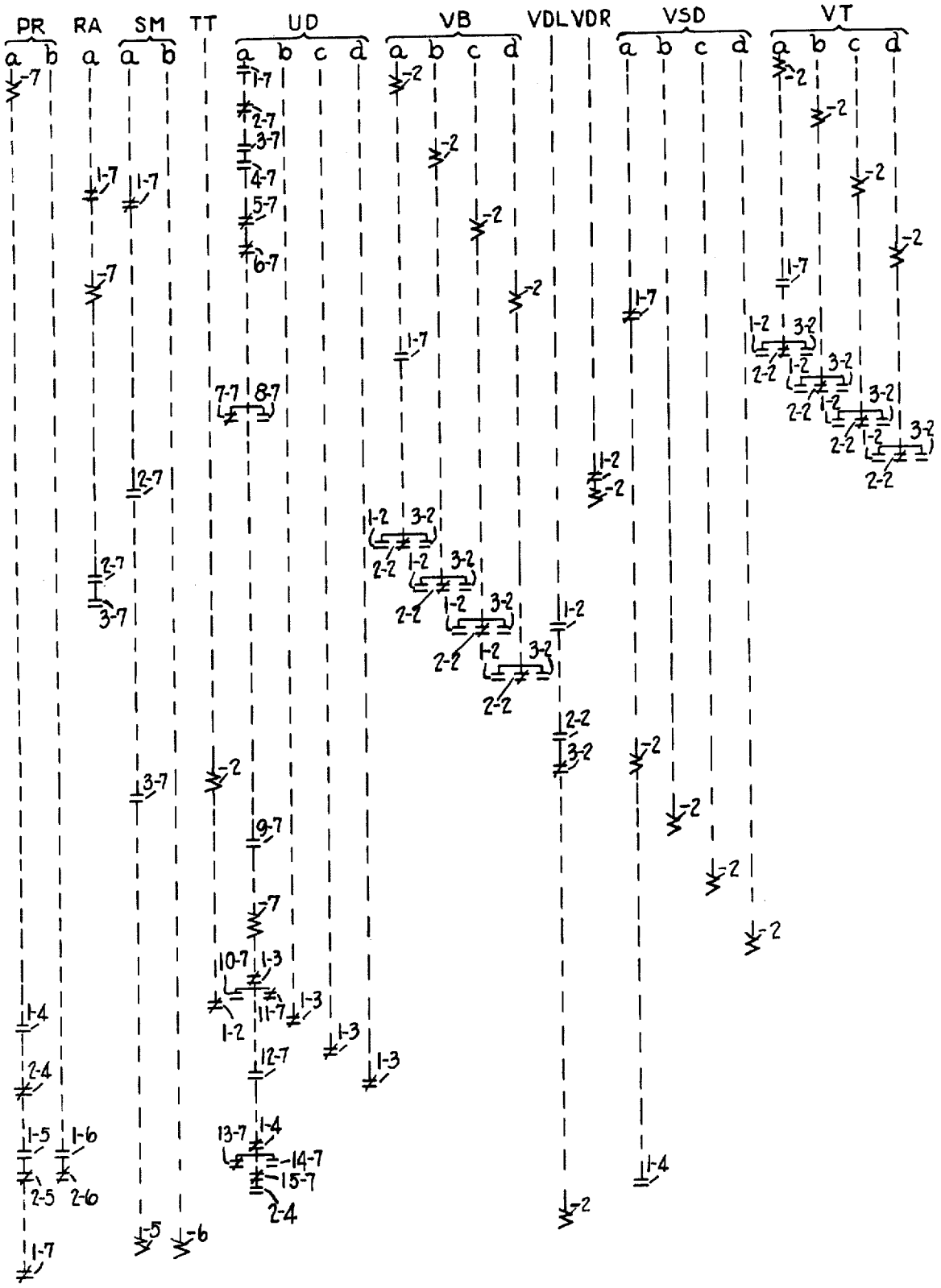
Figure 9E:
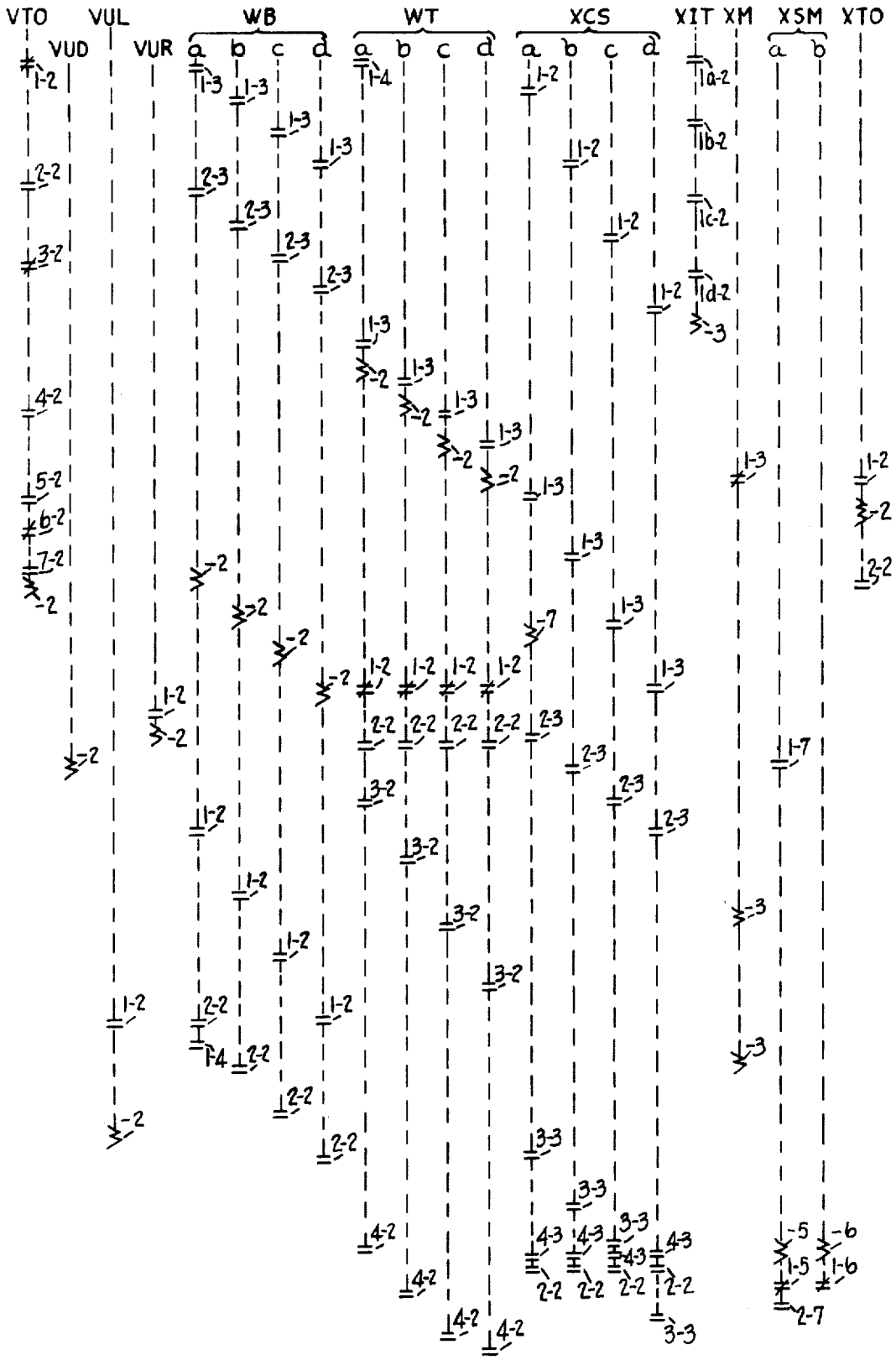

In the drawings:

FIG. 1 is a simplified schematic representation of an installation of four elevators in accordance with the invention;

FIGS. 2 and 3 taken together constitute a simplified schematic wiring diagram of "continuous call" and "on call" circuits for the elevators of FIG. 1;

FIG. 4 is a simplified schematic wiring diagram of the hall lantern circuits for one car;

FIGS. 5, 7 and 8 taken together constitute a simplified schematic wiring diagram of power and control circuits for one of the elevators, certain of the circuits being common to the elevators;

FIG. 6 is a simplified schematic wiring diagram of control circuits for another of the elevators, corresponding to those of FIG. 5; and FIGS. 9a to 9e are key sheets for FIGS. 2 to 8, showing the electromagnetic switches in spindle form.

For a general understanding of the invention reference may be had to FIG. 1, wherein is illustrated by way of example a four car elevator installation in which the cars serve ten floors. The floors are designated generally as L and differentiated by appended reference characters. Each car is raised and lowered by means of a hoisting motor 10, which motor drives a traction sheave 11 over which pass hoisting ropes 12 for the car 13 and counterweight 14. An electromechanical brake 15 is provided and is applied to effect the stopping operation and to hold the car when at rest.

Each car is provided with a car operating panel 16 on which are located a plurality of control switches for operation by the passengers themselves on "without attendant" operation and for operation by the car attendant on "with attendant" operation. These switches include among others a plurality of push buttons, one for each floor above the lower terminal, hereinafter termed car buttons, for registering car calls for both "without attendant" operation and "with attendant" operation and a start control button for "with attendant" operation. Other switches on the operating panel will be referred to later.

Controls are provided at the floors to enable intending passengers to register landing calls, an up control U and a down control D being provided at each intermediate floor, one control D at the top terminal floor and one control U at the bottom terminal floor. Differentiation between these controls is had by appended reference characters. These calls registering controls, which will hereinafter be termed landing buttons, are common to the cars and are shown in FIG. 5.

Referring to the wiring diagrams, FIGS. 2 and 3 are circuits relating to "on call" and "continuous call" operations. FIG. 5 shows the car call registering, car and landing call pick-up, automatic landing call cancelling, farthest car call and farthest landing call circuits for one elevator. This figure also shows the landing call registering circuits which are common to the elevators. Like car call registering circuits, farthest car call circuits and car call pick-up circuits are provided for each of the other elevators as shown in FIG. 6. As regards the farthest landing call circuits, landing call pick-up and automatic landing call cancelling circuits, like circuits are provided for each of the elevators by inter-connection of the selectors as indicated by cross-connecting wires WU, WD, WH and WL for the various floors in FIGS. 5 and 6. FIG. 4 shows the hall lantern circuits for one car. FIG. 7 shows control circuits and power circuits for one elevator, it being understood that such circuits are provided also for the other elevators. The circuits of the two columns of FIG. 2 and of FIG. 3 are joined by vertical feed lines W10, W11 and W12.

The feed lines W10 and W11 supply direct current which may be derived through rectifiers from the main source of supply (not shown) when this source is three phase alternating current. Line W10 is the positive side as indicated by the plus sign in FIG. 2. The feed lines W13 and W14 for the car button circuits of each elevator, see for example FIG. 5, may be connected to lines W10 and W11 respectively. The feed lines W15 and W16 for the hall lantern and signal circuits of each elevator (see FIG. 4) may be supplied with single phase alternating current which may be taken from the above mentioned alternating current supply mains, either directly or through a transformer. The lines B+ and B of FIG. 5 supply direct current utilized in the landing button circuits. The primary of transformer TF of FIG. 5 may be supplied with alternating current from the main source of supply. The secondary of this transformer supplies alternating current utilized in effecting the registration of landing calls and also by way of line AC1 pulsating current utilized in effecting the automatic cancellation of these calls. For convenience line AC1 is not extended down the sheet as in the case of lines B+ and B, but the connections are indicated by applying reference character AC1 to the circuit to which it is connected. The feed lines for the two columns of circuits of FIG. 7 are joined by vertical feed lines W17 and W18.

To facilitate disclosure of an application of the invention, the control system illustrated has been considerably simplified as compared with control systems utilized in commercial installations. It is to be understood that in applying the invention to control systems used commercially, many changes may be made, especially in adapting the invention to the more comprehensive circuits and to control features and apparatus not here shown.

The electromagnetic switches employed in the system illustrated are designated as follows:

AB—Active bottom car switch
ABC—Group active bottom car switch
ABD—First Auxiliary group active bottom car switch
ACT—Automatic time cut-out switch
ACX—Auxiliary time cut-out switch
AS—Auxiliary stopping switch
BLX—Landing call switch
CA—Potential switch
CO—Continuous call relay
CL—Car late switch
DC—Door close switch
DCC—Double landing call switch
DO—Door open switch
EC—Early car switch
H—Field and brake switch
HCC—Multiple landing call switch
HG—Highest car call switch
HJ—Highest landing call switch
HR—Highest call reversal switch
IT—Inactive top car switch
ITC—Inactive top car selection switch
LA—First late car switch
LB—Second late car switch
LC—Third late car switch
LD—Fourth late car switch
LG—Lowest car call switch
LJ—Lowest land call switch
LNR—Load non-stop relay
LR—Lowest call reversal switch
LY—Auxiliary main landing return switch
MF—Middle free car switch
MFC—Group middle free car switch
ML—Main landing switch
MR—Main landing return switch
NS—Non-stop switch
NT—Door time switch
PR—Auxiliary reversing switch
RA—Running switch
SM—Stopping switch
TT—Landing call time switch
UD—Direction switch
VB—Bottom terminal relay
VDL—Down time dispatching switch
VDR—Down selecting switch
VSD—Dispatcing switch
VT—Top terminal relay
VTO—Interval throw-over switch
VUD—Dispatching change-over switch
VUL—Up time dispatching switch
VUR—Up selecting switch
WB—Bottom selection switch
WT—Top selection switch
XCS—Auxiliary car cut-out relay
XIT—Group inactive top car switch
XM—Interchange switch
XSM—Auxiliary stopping switch
XTO—Auxiliary interval throw-over switch Throughout the description which follows, these letters will be applied to the coils of the above designated switches. Also, with reference numerals appended thereto, they will be applied to the contacts of these switches. The release coil of the electromechanical brake is similarly designated BR. Differentiation will be made between the different elevators by appending to the characters employed to designate the various elements of the system small case letters "a", "b", "c" and "d", indicative of the different elevators.

The circuits are shown in "straight", i.e., across-the-line", form in which the coils and contacts of the various switches are separated in such manner as to render the circuit as simple and direct as possible. The relationship of the coils and contacts may be seen from FIGS. 9a to 9e wherein the switches are arranged in alphabetical order with the coils and contacts of the various switches positioned on spindles. Taking any one of the spindle sheets, each switch thereon has all its contacts and coils on that particular spindle sheet. The coils and contacts are related to the wiring diagrams by applying to the particular coil or contact the number of the figure in which it occurs, this being appended following a dash to the particular designation for the contacts. Each coil and contact is positioned on the spindle sheet in alignment with its position on the particular wiring diagram. Thus a coil or contact of any particular switch may be found by taking the spindle sheet on which the switch is located, noting the number applied to the coil or following a dash to the contact and aligning that spindle sheet horizontally with the sheet on which the figure indicated is located. The coil or contact will then be found on that figure in horizontal alignment with that coil or contact on that spindle sheet. For convenience of locating these elements from a reading of the specification without reference to the spindle sheets, the numbers of the figures in which they occur are appended following a dash to both the coils and contacts in the specification and the wiring diagrams.

The electromagnetic switches are illustrated in deenergized [conditions] *condition*, switches UDa and XTO which are of the latching type being shown in reset condition. Each of these switches has two coils, one an operating coil and the other a reset coil. Each of switches AB, IT, LA, LB, LC, LD, LF and XM has two coils.

Referring to the landing call registering circuits of FIG. 5, numerals are appended to the letters U and D for indicating the floors for which the landing buttons are provided. Each of these landing buttons in the preferred arrangement comprises an electronic tube and a fixed button connected to the tube envelope with the circuits arranged so that the tube breaks down in response to manual touch of the fixed button and remains conductive, thereby registering the call and enabling the touch to be discontinued. These electronic tubes are cold cathode gas tubes, the type having a wire anode extending to within a short distance of the glass envelope of the tube, such as the RCA 1C21, having been found satisfactory. With such a tube, the button TB-5, see landing button D3-5, is connected to the tube envelope adjacent the anode. RUL-5 and RDL-5 are loading resistors for the tubes. For such tubes, the preferred voltage values are 135 volts from line B+ to line B, 150 volts r.m.s. from line B to the grounded end of the secondary of transformer TF-5 and 95 volts r.m.s. from line B to line AC1.

It is to be noted that the anode-cathode circuit of the tube of each landing button is from line B+ through the tube and its load resistance to line B. The direct current voltage thus applied to the tube is not sufficient to break down the tube. However, upon an intending passenger touching the landing button, a circuit is established from ground GR through the secondary of transformer TF to line B which is connected through line B+ to the anode of the tube and thence from the tube envelope by way of the body of the intending passenger back to ground. As a result, sufficient alternating current voltage is applied between the anode and the tube envelope to break down the tube. When the tube fires, it becomes illuminated to indicate that the landing call is registered.

The car buttons for car "a" are designated Ca-5 and, as in the case of the landing buttons, have numerals appended thereto as indicative of the floors for which the car buttons are provided. Each car button when pressed is held pressed by a magnet CBMa-7 common to these buttons. The starting button in the car is designated SB1a-7. Other controls are provided on the car panel along with the starting button and car buttons, namely, reversing buttons URBa-7 and DRBa-7 for changing the direction of travel at any floor, non-stop button NSB-7, door open button DOBa-7, and door close button having double contacts DCB1a-7 and DCB2a-7. The hall lanterns are designated HLa-4 and differentiated by reference characters corresponding to the floors for which they are provided and by the letters U and D, in accordance with whether up or down hall lanterns. SCa-7 are safety contacts to effect reopening of the doors should anyone step into their paths while closing. SGLa-7 are limited contacts to render contacts SGa-7 ineffective as the doors reach closed position. Resistors are designated generally as R, rectifiers as V and condensers as Q.

Mechanism actuated in accordance with movement of the elevator car is utilized in the circuits of each elevator. Such mechanism may be in the form of a selector machine 20 as indicated in FIG. 1. The selector machine is driven preferably by means of a steel tape 21 attached to the car and counterweight and having teeth formed thereon for engaging teeth on a selector driving wheel 22. The driving wheel acts through bevel gears 23 to drive a vertical screw 24 which in turn drives a crosshead 25. With this arrangement the crosshead is moved in accordance with movement of the elevator car. A plurality of contacting elements are carried by the crosshead for engaging stationary elements on floor bars 26, one for each floor.

Referring to the circuits for elevator "a" in FIG. 5, one brush CBa-5 carried by the crosshead and the stationary contacts CPa-5 with which it cooperates have to do with the car call pick-up operation. Two of the brushes UPBa-5 and DPBa-5 carried by the crosshead and the stationary contacts UHa-5 and DHa-5 with which they respectively cooperate have to do with landing call pick-up and automatic call cancelling operations. A pair of brushes HJBa-5 and LJBa-5 carried by the crosshead and the stationary contacts HJCa-5 and LJCa-5 with which they respectively cooperate have to do with farthest landing call circuits. Each of these brushes is mounted on a lever for effecting the separation of contacts when the brush engages a stationary contact, these contacts on the levers being designated HBCa-5 and LBCa-5. An isolating cam ICa-5 carried by the crosshead and the hook switches HCa-5 with which it cooperates have to do with the farthest car call operation. This cam has an upper section of insulating material and a lower section LCSa-5 of conducting material. This cam is of a length to engage and open a hook switch for any particular floor slightly ahead of the engagement of the call pick-up brushes with the stationary contacts for that floor when the car is travelling in the up direction and to engage and open the hook switch for the floor below such floor ahead of the engagement of the call pick-up brushes with the stationary contacts for such floor when the car is travelling in the down direction. These hook switches are subject to the control of the car buttons and are arranged in series circuit relationship in the farthest car call circuits.

Referring now to FIG. 4, two additional brushes on the crosshead are for the hall lantern circuits, one for each direction of travel. The up brush is designated ULBa-4 and the down brush is designated DLBa-4. The contacts engaged by brush ULBa-4 are designated generally as ULCa-4 while those engaged by brush DLBa-4 are designated generally as DLCa-4. While these brushes and cams have for convenience been assumed to move in synchronism with the car, it is to be understood that in actual practice they will be in advanced positions, preferably by moving them to such positions incident to starting the car and returning them to positions corresponding to car position incident to stopping the car as is well understood in the art. In FIG. 7 is a switch DZa-7 which is carried by the crosshead. This switch is actuated by cams (not shown) on the floor bars and is for determining the zone of door operation. Other brushes carried by the crosshead and their cooperating stationary contacts will be referred to later.

A plurality of throw-over switches TO for each car is utilized to provide either "without attendant" or "with attendant" operation. Change-over switches CO are also provided in the circuits to illustrate certain differences in operation which may be had.

The circuits for controlling the starting and stopping of car "a" are shown in FIG. 7. Any suitable form of power supply may be provided for the elevator motor. One of the preferred arrangements which has been illustrated is to employ a direct current elevator motor and to cause current to be supplied to the motor at a variable voltage, as from a driven generator in accordance with Ward-Leonard principles. The driving motor for the motor generator set has not been illustrated. It is to be understood that either a direct current or alternating current driving motor may be employed, depending upon the kind of power supply to the building and the character of the installation, and that any suitable control arrangement therefor may be utilized. An exciter not shown which may be driven by the driving motor for the motor generator set may be employed to supply current to feed lines W17a and W18a and thus to the separately excited field windings of the supply generator and the elevator motor and to the brake coil and the coils of the various electromagnetic switches of FIG. 7.

The armature of the generator of the motor generator *set* is designated GAa-7, its separately excited field winding being designated GFa-7 and its series field winding GSFa-7. The armature of the elevator motor is designated MAa-7 and its separately excited field winding EMFa-7. Safety devices are indicated as SDa-7 and are arranged in circuit with the coil CAa-7 of the potential switch.

The door operating circuits for car "a" are also shown in FIG. 7. A hoistway door is provided at each floor and a door is provided on the car. The car door and hoistway doors have not been shown. A door operating motor is included in the door operating circuits, the motor being carried by the car and actuating both the car door and the hoistway door for the floor at which the car is stopped as is well understood in the art. The armature of the door operating motor is designated DMAa-7 and its field winding DMFa-7. Contacts operated by the car door to engage when the door is closed are designated GSa-7. The door contacts operated by the various hoistway doors are arranged in series relation. These contacts are not closed until the doors are closed and locked. For convenience these door contacts are shown as a single pair of contacts designated DSa-7.

In describing the operation of the system, it will first be assumed that all cars are on "without attendant" operation, as indicated by the position of the throw-over switches TO. It will also be assumed that the cars are on "on call" operation and idle. Under such conditions, switch CC is deenergized as all landing calls have been answered, one car is parked at a selected intermediate landing, another at the bottom terminal, another at the top terminal and a fourth at the bottom terminal. The car which is parked at the selected intermediate landing is the "middle free car", one of those parked at the bottom terminal is the "active bottom car", the car parked at the top terminal is the "inactive top car", and the other car parked at the bottom terminal is the "inactive bottom car". The selected intermediate landing which will be termed the middle free car parking floor will be assumed to be the sixth floor. It will also be assumed that car "a" has become the middle free car, car "b" the active bottom car, car "c" the inactive top car and car "d" the inactive bottom car, the cars being illustrated for this condition in FIG. 1. The circuits for FIG. 5 are arranged for parking the middle free car at the sixth floor. However, for convenience and to minimize circuit cross-overs, the circuits for car "a" are shown for the condition in which the car is at the bottom terminal. It will be understood that with car "a" parked at the sixth floor, cam ICa-5 is in engagement with switch HC6a-5 while brushes CBa-5, UPBa-5, DPBa-5, HJBa-5, LJBa-5 and FBa-5 are in engagement with their respective sixth floor stationary contacts. Also, as car "a" is the middle free car, its switch MFa is in operated condition. The manner in which the above operations are effected will be understood from further description.

The cars park with their doors closed. Inasmuch as the registration of a landing call for a floor above the bottom terminal starts the middle free car in operation, the circuits for this car will be first considered. Assume that the car is set for upward travel for which condition switch UDa is latched in operated condition. Also under the assumed conditions a circuit is completed for the coil of switch RAa through contacts HJ1a-7, UD8a-7, CC2a-7, rectifer V1a-7, and switch TO1a-7, causing the switch RA to be operated. Assume now that an intending passenger at the seventh floor touches landing button U7-5. With the registration of this call, the potential drop across load resistance RUL7-5 causes operation of switch HJa, the circuit being from the left-hand side of resistor RUL7-5 through rectifier VHU7-5, rectifiers VH7-5 through VH2-5, contact HJC1a-5, brush HJBa-5, rectifier VHJa-5, contacts MF2a-5, coil HJa-5, line B, back to the right-hand side of resistor RUL7-5. Switch HJa separates contacts HJ1a-7 which, owing to the fact that contacts UD7a-7 are separated, breaks the circuit for the coil of switch RAa. Switch RAa drops out to engage contacts RA1a-7. This completes a circuit for the coil of switch Ha, the circuit being through contacts CA1a-7, NT2a-7, GSa-7, DSa-7 and UD4a-7, terminal stopping switch SS1a-7 and contacts RA1a-7. Switch Ha operates to engage contacts H7a-7, completing a circuit through contacts UD10a-7 and UD14a-7 for generator field winding GFa-7, and to engage contacts H6a-7, completing a circuit for the release coil BRa-7 of the electromechanical brake. As a result the brake is released and the car is started in the up direction.

Upon the engagement of brush UPBa-5 with contact UH7a-5, a circuit is completed which connects the coil of switch XSMa across loading resistance RUL7-5, the circuit being from the left-hand side of resistance RUL7-5 through contact UH7a-5, brush UPBa-5, contacts PR1a-5 and NS1a-5, coil XSMa-5, resistor Ra-5, to line B, and thus back to the right-hand side of resistor RUL7-5, causing operation of this switch. Switch XSMa engages contacts XSM1a-5, completing a circuit through contacts AS2a-5 for the coil of switch SMa. Switch SMa engages contacts SM2a-7 to complete a circuit for the coil of switch NTa. Switch NTa engages contacts NT3a-7 to establish a self-holding circuit. It also engages contacts NT1a-5, completing a circuit from the tapped point of the secondary of transformer TF-5 through rectifier V1-5, by way of line AC1, through contacts NT1a-5, rectifier V3a-5, contacts NS1a-5 and PR1a-5, brush UPBa-5, and contact UH7a-5 to the cathode of the tube of button U7-5. Rectifier V1-5 passes the positive halves of the alternating current cycle, thus raising the potential of the cathode with respect to the anode. This reduces the voltage across the tube to below sustaining value, pulsing out the tube. Thus the up landing call at the seventh floor is automatically cancelled as soon as the call is picked up. Switch NTa also separates contacts NT2a-7 which breaks the circuit for the coil of switch Ha. Switch Ha drops out, separating contacts H7a-7 and H6a-7 to break the circuit for generator field winding GFa-7 and the circuit for the brake release coil BRa-7. Thus the brake is applied and the car is brought to a stop. At the same time contacts H8a-7 engage to connect the generator separately excited field winding to the generator armature with a polarity to oppose the residual flux of the generator field.

Switch NTa also engages contacts NT1a-7 which with the closing of switch DZa-7 completes a circuit for the coil of switch DOa. This switch engages contacts DO3a-7 and DO4a-7 to complete a circuit for the armature DMAa-7 of the door operating motor to cause the opening of the doors. As the doors reach open position, limit switch DOL1a-7 opens to deenergize the coil of switch DOa and limit switch DOL2a-7 opens to break the holding circuit for the coil of switch NTa. When switch SMa operated, the engagement of contacts SM2a-7 completed a charging circuit for condenser Q3a-7 connected across coil NTa-7 and the engagement of contacts SM3a-7 completed a charging circuit through contacts XSM1a-7 for condenser Q4a-7 connected across coil NTa-7. Thus switch NTa does not drop out immediately its circuit is broken, being delayed by the discharge of condensers Q3a-7 and Q4a-7.

Assume that prior to the picking up of the seventh floor call, a down landing call is registered for the ninth floor. This maintains switch HJa operated and thus switch RAa deenergized when the up seventh floor call is cancelled. Assume further that the passenger who enters the car at the seventh floor desires to be carried to the eighth floor and presses the eighth floor car button C8a-5. The button is held pressed by magnet CBMa-7, the circuit for the magnet being through contact SM1a-7, engaged as a result of the cancellation of the up seventh floor landing call. The car button causes operation of switch HGa, the circuit for coil HGa-5 being through switches HCa-5 for the eighth, ninth and tenth floors. Switch HGa engages contacts HG1a-7 to complete a circuit to maintain magnet CBMa-7 energized when an intervening stop is made.

Upon the expiration of the door time interval of switch NTa, contacts NT2a-7 engage to complete the circuit for the coil of switch DCa which engages contacts DC2a-7 and DC3a-7 to cause energization of the door operating motor to effect the closing of the doors. Resistor R6a-7 acts to cause the door closing operation to take place at a slow speed. As the doors reach closed position door close limit switch DCL1a-7 opens to deenergize switch DCa. Also contacts GSa-7 and DSa-7 close to complete the circuit for the coil of switch Ha to effect the restarting of the car.

Upon the engagement of cam ICa-5 with switch HC8a-5 the circuit for the coil of switch HGa is broken. However, the car button magnet CBMa-7 is maintained energized through contacts SM1a-7. Thus upon the engagement of brush CBa-5 with contact CP8a-5, a circuit is completed through button C8a-5 for the coil of switch SMa, causing the stopping of the car at the eighth floor and the opening of the doors as above described. Also switch SMa separates contacts SM1a-7 and inasmuch as the highest car call has been reached so that contacts HG1a-7 are separated, the car button magnet is deenergized to release the car button. This deenergizes switch SMa which reengages contacts SM1a-7 to reestablish the car button magnet circuit.

Upon the expiration of the door time interval after the stop at the eighth floor, switch NTa drops out to effect the reclosing of the doors and starting of the car in the up direction. It is to be noted that, when a stop is effected solely in response to a car button, switch XSMa is not operated and thus condenser Q4a-7 is not charged so that a shorter door time interval is provided. Upon the engagement of brush HJBa-5 with contact HJC9a-5, inasmuch as there is no landing call registered for a floor above the ninth floor and inasmuch as contacts HBCa-5 are separated by the engagement of the brush with the contact, the circuit for the coil of switch HJa is broken. The resultant engagement of contacts HJ1a-7 completes a circuit through contacts UD8a-7 for the coil of switch RAa. Switch RAa operates to separate contacts RA1a-7, breaking the circuit for the coil of switch Ha, causing the car to be brought to a stop at the ninth floor. At the same time brush LJBa-5 engages contact LJC9a-5, with the result that the coil of switch LJa is connected across loading resistor RDL9-5, causing this switch to operate. The resultant engagement of contacts LJ2a-7 along with the engagement of contacts HJ2a-7 completes a circuit for the coil of switch HRa through contacts NT5a-7 and UD12a-7 and switch HRSa-7 (closed because it is off cam HRCa-7 when the car is away from the main landing). Switch HRa operates to engage contacts HR3a-7, establishing a self-holding circuit. It also separates contacts HR1a-7, breaking the circuit for the coil of switch PRa. Switch PRa drops out separating contacts PR1a-5 and engaging contacts PR2a-5. The engagement of contacts PR2a-5 connects the coil of switch XSMa across loading resistor RDL9-5, causing this switch to operate. The resultant engagement of contacts XSM1a-7 completes a circuit for the coil of switch NTa. Thus upon the operation of switch NTa to engage contacts NT1a-5 a circuit is completed through contacts PR2a-5, brush DPBa-5 and contact DH9a-5 to cause the pulsing out of the tube of the ninth floor landing button, automatically cancelling the call. This results in the dropping out of switch LJa. Switch NTa also effects the opening of the doors as above described. As the stopping of the car is effected, contacts H5a-7 engage to complete a circuit through contacts HR2a-7 and UD9a-7 for the reset coil of switch UDa. This switch is reset, setting the car for downward travel and also separating contacts UD12a-7 to break the holding circuit for the coil of switch HRa.

So long as a landing call is in registration for a floor above the main landing, a circuit is established for the coil of switch BLX, connecting it across the loading resistor or resistors of the tubes upon which landing calls are registered. As the down ninth floor landing call is cancelled, no landing calls remain registered so that switch BLX is dropped out. Thus contacts BLX1a-5 engage, completing a circuit through contacts MF1a-5 and BLX1a-5, switches HC6a-5 to HC9a-5, and cam LCSa-5 for the coil of switch LGa. Switch LGa engages contacts LG1a-5 to complete a circuit for the coil of switch LJa. Switch LJa again operates, separating contacts LJ1a-7. This, with the separation of contacts [UDSa-7] *UD8a-7* as the change in direction is effected, breaks a circuit for the coil of switch RAa.

Assume that a passenger enters the car and presses fourth floor car button C4a-5. Inasmuch as contacts RA1a-7 are now engaged, upon the expiration of the door time interval and closure of the doors, the engagement of door contacts GSa-7 and DSa-7 causes operation of switch Ha to effect the restarting of the car. The starting of the car is in the down direction as contacts UD11a-7 and UD13a-7 are now engaged.

Assume that before the car reaches call pick-up distance from the seventh floor a down seventh floor call is registered. This causes operation of switch BLX which separates contacts BLX1a-5. The circuit for the coil of switch LGa is maintained however by way of car button C4a-5. Upon the engagement of brush DPBa-5 with contact DH7a-5, switch XSMa is operated to cause the stopping of the car at the seventh floor and the automatic cancellation of the down seventh floor call. This results in the reengagement of contacts BLX1a-5. Assume that a passenger enters the car and presses the fifth floor car button C5a-5. Upon the reclosure of the doors, the car restarts in the down direction. As the car runs past the sixth floor, switch HGa is operated as no landing calls are registered and thus a circuit is completed through contacts MF1a-5 and BLX1a-5 for the coil of this switch. Switch HGa engages contacts HG1a-5 to cause operation of switch HJa. Upon the car reaching call pick-up distance from the fifth floor, the engagement of brush CBa-5 with contact CP5a-5 causes operation of switch SMa to effect the stopping of the car at the fifth floor. Upon the reclosure of the doors, the car is restarted in the down direction and stopped at the fourth floor in response to the fourth floor car call, the car button being maintained in operated condition until brush CBa-5 engages contact CP4a-5 to cause operation of switch SMa to initiate the stop. Since this is the lowest car call, switch LGa is dropped out as a result of the engagement of cam ICa-5 with switch HC4a-5. Inasmuch as there is no landing call for a floor below, the circuit for the coil of switch LJa is broken upon the engagement of brush [LYJBa-5] *LJBa-5* with contact LJC4a-5 to open contacts LCBa-5, contacts LG1a-5 being separated. Switch LJa engages contacts LJ3a-7 which completes a circuit through contacts NT5a-7, switch TO7a-7, contacts HJ3a-7 and UD15a-7 for the coil of switch LRa. This switch engages contacts LR3a-7 to establish a self-holding circuit and engages contacts LR1a-7 to cause operation of switch PRa. It also engages contacts LRZa-7 which, with the engagement of contacts H5a-7, completes a circuit for the set coil of switch UDa, causing operation of this switch to set the car for travel in the up direction.

Inasmuch as there are now no calls remaining to be responded to, the car is returned to the middle free car parking floor. Incident to the car being brought to a stop at the fourth floor, the engagement of contacts LJ1a-7 reestablishes the circuit for the coil of switch RAa. However, this circuit is broken as soon as the direction of car travel is changed with the resultant separation of contacts UD7a-7 inasmuch as contacts HJ1a-7 are separated. Thus upon the expiration of the door time interval and the closing of the doors a circuit is completed for the coil of switch Ha, causing restarting of the car in the up direction. Upon the engagement of cam ICa-5 with switch HC6a-5, the circuit for the coil of switch HCa is broken. Thus, upon the engagement of brush HJBa-5 with contact HJCa-5 to effect the opening of contacts HBCa-5, the circuit for the coil of switch HJa is broken. This switch drops out to engage contacts HJ1a-7 completing a circuit for the coil of switch RAa which acts to separate contacts RA1a-7. This breaks the circuit for the coil of switch Ha to cause the car to be brought to a stop at the sixth floor. Inasmuch as there is no call in registration for the sixth floor under the assumed conditions, switch SMa is not operated so that switch NTa is not operated to cause the opening of the doors as the stop is made. It is to be noted if there had been a call for a floor beyond, switch HJa wound have been maintained operated so that the car would run past the parking floor without stopping as set forth above.

As each stop is made contacts H1a-5 engage to complete a circuit for the coil of switch ASa through brush FBa-5 and the stationary contact FCa for the particular floor at which the stop is being made. Switch ASa engages contacts AS1a-5 to become self-holding and separates contacts AS2a-5 in the circuit for the coil of switch SMa. This prevents unwanted stopping of the car as it leaves the floor in response to a late call registered for that floor.

It is believed that it will be understood from the above description that, during upward travel of the car, stops are made in response to calls registered by the car buttons and up landing buttons for floors above the car, in the order in which the floors are reached by the car, regardless of the order in which the calls are registered. Similarly, during downward travel of the car, stops are made in response to calls registered by car buttons and down landing buttons for floors below the car, in the order in which the floors are reached by the car, regardless of the order in which the calls are registered. Also, during upward travel of the car, a stop may be made at a floor in response to a down landing call, provided no calls are registered for floors above and an up landing call for that floor is not registered to maintain the coil of switch HJa operated. Similarly, during downward travel of the car, a stop may be made at a floor in response to an up landing call provided no calls are registered for floors below and a down landing call has not been registered for that floor to maintain the coil of switch LJa energized. When all calls are responded to, the car automatically returns to the middle free car parking floor where it parks with the doors closed.

As each intervening stop is made during upward travel of the car a circuit is completed, through brush ULBa-4 and the stationary contact ULCa-4 for the floor at which the stop is being made, for the up hall lantern UHLa-4 for that floor. The completion of this circuit is effected by the engagement of contacts NT1a-4 and is maintained through door close limit switch DCLa-4 until the doors reclose. Similar operation is had in the case of each intervening stop during downward travel of the car. In this case the circuit for the down hall lantern DHLa-4 for the particular floor at which the stop is being made is completed through the stationary contact DLCa-4 for that floor, brush DLBa-4 and contacts NT1a-4. Contacts PR1a-4 render brush ULBa- 4 effective for up car travel and contacts PR2a-4 render brush DLBa-4 effective for down car travel. When the car in its upward travel stops in response to a down landing call or in response to a car call under conditions where no call is registered for a floor above, the operation of switch HRa causes the dropping out of switch PRa as previously explained. This effects the separation of contacts PR1a-4 and the engagement of contacts PR2a-4 to cause the lighting of the down hall lantern. When the car in its downward travel stops in response to an up landing call or in response to a car call under conditions where no call is registered for a floor below, switch LRa operates to cause reoperation of switch PRa and thus causes lighting of the up hall lantern. When a stop is made at the middle free car parking floor under conditions where no call is in registration for that floor, inasmuch as switch SMa is not operated, switch NTa is not operated and thus contacts NT1a-4 do not engage and a hall lantern is not lighted. For convenience, the hall lanterns are not shown in FIG. 1.

If while the car is parked, an intending passenger, desiring to use the car, touches a landing button, switch XSMa operates to engage contacts XSM1a-7, completing a circuit through contacts H4a-7 and MF1a-7 for the coil of switch NTa. This causes opening of the doors. Also contacts HJ1a-7 or LJ1a-7 separate momentarily to break the circuit for the coil of switch RAa, the dropping out of this switch being delayed by the discharge of condenser Q1a-7 to prevent the starting of the car before the door opening operation is initiated. Thus the intending passenger may enter the car and register a car call for his destination and the car starts upon reclosure of the doors.

Should the car become loaded to a certain percent of capacity, load weighing switch LWSa-7 closes. This switch may be a microswitch operated by the car platform. With switch LWSa-7 closed, upon the operation of switch DCa to initiate the door closing operation, contacts DC1a-7 engage to complete a circuit for the coil of relay LNRa. This relay upon operation engages contacts LNR1a-7 to become self-holding. It also separates contacts LNR2a-7 to effect the deenergization of switch NSa. This switch operates to separate contacts NS1a-5 and NS1a-4 and thus prevents the picking up of landing calls and lighting of hall lanterns until room is again provided in the car by the discharge of passengers. Where a car call stop is made, the separation of contacts DO2a-7 breaks the holding circuit for the coil of relay LNRa, with the result switch N3a is reoperated. This causes automatic cancellation of a landing call, if registered, for the direction in which the car is set to leave the floor.

It will be seen that the arrangement thus far described the middle free car when idle parks in the middle of the building to be in the best position on the average to take care of interfloor traffic. Incoming traffic is taken care of by the active bottom car parked at the main landing. Assume that an incoming passenger touches up landing button U1-5 at the main landing. This causes operation of switch XSMb to complete a circuit through contacts for car "b" corresponding to contacts AB1a-7 for effecting the opening of the doors for active bottom car "b". The doors for the inactive bottom car "c" are not opened as contacts for car "c" corresponding to contacts ML1a-7 are separated. Thus the passenger enters car "b" and presses a car button for his destination. Upon the closure of the doors the car starts in the up direction. During its operation above the main landing, car "b" assists car "a" in responding to landing calls, the calls being answered by the car whose landing call pick-up brush for the direction of the call is first to engage its corresponding stationary contact for the floor for which the call is registered. Upon answering its highest call, the active bottom car returns to the main landing. There may be an interchange of cars under such conditions as to which is the middle free car and which is the active bottom car, as will be explained later. Assuming for convenience car "b" to continue as the active bottom car, a circuit exists through contacts MF3b-6, IT4b-6 and ML2b-6 for the coil of switch MRb, causing this switch to be operated. This switch engages contacts MR1b-6 to complete a circuit through hook switches HCb-6 up to cam LCSb-6 for the coil of switch LGb-6. This switch operates to engage contacts LG1b-6, causing operation of switch LJb. This causes the car upon answering its highest call to be set for downward travel and started in the down direction upon the closing of the doors, as explained for car "a". The car answers car calls and down landing calls on its downward trip. Upon returning to the main landing, it parks with its doors closed unless someone enters the car and presses a car button.

When certain service demand conditions arise, the system is automatically thrown over to "continuous call" operation. This is effected by causing operation of relay CC. When a landing call is registered for a landing above the main landing, switch BLX is operated to separate contacts BLX1-2, breaking the energizing circuit for the coil of switch TT. This switch is delayed in dropping out by the discharge of condensers Q3-2 and Q4-2, say for one minute, this time depending upon the characteristics of the particular installation. Thus if there is continuous registration of one landing call or overlapping landing calls for this period, switch TT drops out to engage contacts TT1-2, completing a circuit through contacts BLX2-2 for the coil of relay CC, causing this relay to operate. Where two landing calls are in registration, switch DCC is operated, causing the separation of contacts DCC1-2 to disconnect condenser Q4-2 from across coil TT-2, shortening the time interval, say to thirty seconds if the two calls are registered at about the same time and are unanswered before the interval expires. When switch DCC operates it also engages contacts DCC2-2 to connect condenser Q4-2 across discharge resistor R5-2. Thus if two calls overlap for only a short period, upon the dropping out of switch DCC, condenser Q4-2 is reconnected across coil TT-2 to subject it also to the remaining charge on condenser Q4-2. Should more than two landing calls be registered, say four, switch HCC operates to engage contacts HCC1-2 to cause the immediate operation of relay CC. Should any car be operating automatic load non-stop, the engagement of its LNR1-2 contacts causes the immediate operation of relay CC, provided a landing call is in registration, signified by the engagement of contacts BLX2-2. Upon operation, relay CC engages contacts CC2-2 to establish a self holding circuit and throws over the system to "continuous call" operation. This operation will now be described.

Relay CC separates contacts CC1-3 to render "on call" car selection circuits ineffective. It also engages contacts CC1-2 to render dispatching circuits effective and engages contacts CC2-5 to cut out switches DCC and HCC. It also operates contacts CC1a-7, CC2a-7 and CC3a-7 to effect certain changes in the operation of switches RAa and NTa, the same changes being made in the control of these switches for each of the other cars. It also operates contacts CC1a-4, CC2a-4 and CC3a-4 to effect changes in the terminal hall lantern circuits for car "a", like changes being made in the hall lantern circuits for each of the other cars. It also engages contacts CC1a-5, CC1b-6 and like contacts for cars "c" and "d", causing operation of switches HG for all cars.

The engagement of contacts CC1-2 completes a circuit for the coil of switch VSD for the selected car at each terminal floor to dispatch that car on its trip to the opposite terminal. Under the conditions assumed for operation on "on call", this will be car "c" at the top terminal and car "d" at the bottom terminal (main landing), car "d" being the selected car instead of car "b". This is due to the fact that car "b" has been assumed to have left and then returned to the bottom terminal, the selection of car "d" occurring as car "b" left as will be explained below. The selection of the cars is controlled by relays VB and VT, switches WB and WT and notching relays of the rotary type designated VUR and VDR.

When car "c" arrived at the top terminal under the previous assumption, the engagement of its brush SDBc-2 with contact SDTc-2, completed a circuit for the coil of relay VTc. This relay operated to engage contacts VT1c-2 and VT3c-2 and separate contacts VT2c-2. This caused the notching of relay VDR-2 to move its brushes VDRB1-2 and VDRB2-2 into engagement with contacts VDRC1c-2 and VDRC2c-2, the successive notching operations where there is more than one step being effected by the momentary separation of contacts VDR1-2 at the end of each notching step. When contact VDRC2c-2 is engaged, no further notching takes place as contacts VT2c-2 are separated. The engagement of brush VDRB1-2 with contact VDRClc-2 completed a circuit through contacts VT1c-2 for the coil of switch WTc. This selected car "c". When car "b" arrived at the bottom terminal under the previous assumption, its brush SDBb-2 engaged contact SDMb-2, causing operation of relay VBb to engage contacts VB1b-2 and VB3b-2 and separate contacts VB2b-2. This caused operation of notching relay VUR to effect operation of switch WBb, this operation being similar to that described for effecting operation of switch WTc. This selected car "b". The later arrival of car "d" at the lower terminal caused the operation of relay VBd but no further notching took place because contacts VB2b-2 remained separated. However, when car "b" left the lower terminal in response to the car call, relay VBb dropped out so that relay VUR notched into position to effect operation of switch WBd and thus select car "d". This selection was retained when car "b" returned to the lower terminal as contacts VB2d-2 remained separated.

With switches WBd and WTc operated, contacts WB1d-2 and WT3d-2 are engaged so that upon the engagement of contacts CC1-2 a circuit is completed by way of contacts VUL1-2 for the coil of switch VSDd and a circuit is completed by way of contacts VDL3-2 for the coil of switch VSDc. Switch VSDd acts to dispatch car "d" on an upward trip. Details of the dispatching operation will be given in connection with the circuits for car "a" upon the arrival of that car at the lower terminal. Switch VSDc acts to dispatch car "c" on a downward trip as will be explained for car "a" upon its arrival at the upper terminal.

As car "d" is started on its upward trip, the engagement of its contacts H1d-2 completes a circuit through contacts NT1d-2 and WB2d-2 for the coil of switch VUL-2 and for charging condenser Q6-2. As the car moves away from the main floor, brush SDBd-2 moves off contact SDMd-2, breaking the circuit for the coil of relay VBd. This relay in turn separates contacts VB1d-2, causing the dropping out of switch WBd to separate contacts WB2d-2. This breaks the circuit for the coil of switch VUL-2 which is delayed in dropping out by the discharge of condenser Q6-2 to provide an up dispatching interval. The dropping out of relay VBd causes notching of relay VUR to select another car. This will be car "b" as it has been assumed to have returned to the main landing and thus its relay VBb is operated. The operation of switch WBb upon selection of car "b", results in the engagement of contacts WB1b-2. Thus upon the engagement of contacts VUL1-2 as switch VUL drops out at the end of the dispatching interval, a circuit is completed for the coil of switch VSDb to cause the dispatching of car "b" on its upward trip and the reestablishment of the up dispatching interval.

Similar operation is had upon the starting of car "c" on its downward trip. The engagement of contacts H2c-2 completes a circuit through contacts NT2c-2 and WT4c-2 for the coil of switch VDL and for charging condenser Q7-2. As the car moves away from the top landing, brush SDBc-2 moves off contact SDTc-2, breaking the circuit for the coil of relay VTc. This relay in turn separates contacts VT1c-2, causing the dropping out of switch WTc to separate contacts WT4c-2. This breaks the circuit for the coil of switch VDL-2 which is delayed in dropping out by the discharge of condenser Q7-2 to provide a down dispatching interval.

The next car to arrive at the top terminal is selected as the next to leave. This will probably be car "a". When contacts CC1-3 separated as the changeover was effected, they caused the dropping out of switch MFa. Thus contacts MF1a-5 are separated, opening the circuit for causing return of car "a" to the middle free car parking floor. Assuming the car is set for upward travel at the time of the changeover, the operation of switch HGa maintains switch HJa operated and thus contacts HJ2a-7 separated. This maintains the car set for upward travel. Switch RAa is maintained deenergized by contacts VT1a-7 and VB1a-7 when the changeover is effected. Thus, upon the expiration of the door time interval and the closure of the doors after each stop the car is restarted in the up direction until the top terminal is reached. When this occurs, switch HGa is dropped out by the opening of the switch HC10a-5. Switch HJa is maintained operated by way of contacts HBCa-5 and ML1a-5. Upon the engagement of brush CBa-5 with contact CP10a-5, a circuit is completed for the coil of switch SMa, causing the car to be brought to a stop at the top floor. As the stop is made, contacts H5a-7 engage, completing a circuit through brush RBa-7, contact RC10a-7 and contacts UD9a-7 for the reset coil of switch UDa, causing the car to be set for downward travel. As the car arrives at the top terminal, brush SDBa-2 engages contact SDTa-2, completing a circuit for the coil of relay VTa. This relay upon operation causes operation of relay VDR. Relay VDR notches into position to cause operation of switch WTa, selecting car "a". Thus car "a" is brought to the top terminal and selected for dispatching. The circuits for controlling the starting of the car in response to the dispatching operation will now be described.

Relay VT upon operation also engages contacts VT1a-7 to complete a circuit through contacts H1a-7, CC1a-7 and VSD1a-7 for the coil of switch RAa. Thus switch RAa is operated and prevents the starting of the car on its downward trip until the down dispatching interval has expired. Incident to this operation, switch RAa engages contacts RA3a-7 to complete a circuit through contacts CC3a-7 to maintain switch NTa operated and thus the doors in open position until the dispatching interval expires. Switch WTa engages contacts WT1a-4 to complete a circuit for the down hall lantern DHL10a-4 for selected car "a", contacts PR2a-4 being engaged incident to setting the car for downward travel. Switch WTa also engages contacts WT3a-2 so that upon the expiration of the dispatching interval and consequent engagement of contacts VDL3-2 a circuit is completed for the coil of switch VSDa. This switch operates to separate contacts VSD1a-7 to break the circuit for the coil of switch RAa. This breaks the circuit for the coil of switch NTa causing the closing of the doors and as the doors reach closed position the hall lantern is extinguished and the car is started in the down direction. Switch Ha separates contacts H1a-7 and thus prevents reoperation of switch RAa upon the reengagement of contacts VSD1a-7 as a result of the engagement of contacts H2a-2. As the car leaves the floor, switch VTa drops out, separating contacts VT1a-7 in the circuit for coil RAa-7 and separating contacts VT1a-2 to cause the dropping out of switch WTa to restart the dispatching interval.

When car "a" is started from the top terminal switch LGa is in operated condition, its circuit being through contacts MR1a-5, the coil of switch MRa being energized through contacts MF3a-5, IT4a-5, and ML2a-5. Thus switch LJa is operated and contacts LJ3a-7 are separated, preventing the operation of switch LR to change the direction of car travel at the next stop. Switch LGa is maintained operated until cam ICa-5 runs onto switch HCla-5 as the car approaches the bottom terminal. Switch LJa is maintained operated by way of contacts LBCa-5 and IT2a-5 until the car arrives at the bottom terminal. When brush CBa-5 engages contact CP1a-5, switch SMa is operated, causing the car to be brought to a stop. As the stop is made, contacts H5a-7 engage, completing a circuit through brush RBa-7 and contact RC1a-7 for the set coil of switch UDa, causing the car to be set for upward travel. Also brush SDBa-2 engages contact SDMa-2, causing the operation of relay VBa and, if no other car is selected at the bottom terminal, thus the operation of switch WBa to select car "a". Switch WBa also engages contacts WB1a-4 to cause lighting of up hall lantern UHL1a-4. Also relay VBa engages contacts VB1a-7 to cause operation of switch RAa, thus preventing the reclosing of the doors and starting of the car until the dispatching interval has expired. Upon the expiration of the dispatching interval, switch VUL drops out, engaging contacts VUL1-2, completing a circuit through contacts WB1a-a for the coil of switch VSDa. This switch separates contacts VSD1a-7 to cause the closing of the doors, extinguishing of the hall lantern and starting of the car in the up direction. As the car leaves, switch WBa drops out to restart the dispatching interval.

Thus it is seen that, under "continuous call" operation, the cars are selected for dispatching on their up and down trips in the order of their arrival at the terminals. The dispatching operations occur at the expiration of given time intervals. Each car on its upward trip stops at floors for which it has car calls registered and for which up landing calls are registered. Also, each car on its downward trip stops at floors for which it has car calls registered and for which down landing calls are registered. If a car arrives at a terminal before the dispatching interval expires, it waits upon the expiration of the interval. If a car arrives after the interval expires, it is dispatched immediately. An arrangement is provided for automatically adjusting the dispatching interval in accordance with whether the cars are early or late on a round trip basis. This arrangement will now be described.

As a dispatched car leaves the top terminal for example, contacts WT4-2 for that car separate, breaking the circuit for the coil of switch VDL. The potential across the coil at this instant is the difference in potential between the points Z and X, the potential of point Z being that of line W10 and that of point X being the ratio of resistors R10-2 to R9-2 times the potential of line W10. As condenser Q7-2 discharges, the potential of point Z gradually decreases until a point is reached where difference in potential between points Z and X falls below the hold-in voltage of switch VDL which drops out. The timing of the dropping out of switch VUL is effected in a similar manner, the switch dropping out when the potential difference between points Y and X falls to below the hold-in voltage of the switch. Inasmuch as the resistance of the coils of switches VDL and VUL are of high ohmic value as compared with that of resistors R10-2 and R9-2, these resistors may be used for both switches. The potential of point X is determined by the effective amount of resistor R9-2, which is determined by the condition of switches LA, LB, LC and LD, in turn determined by whether the cars are ahead of or behind time.

For convenience, assume that switches LA, LB, LC, LD and VTO are in deenergized condition, that switch XTO is in reset condition, and that the next car, say car "a", is late in arriving at the top terminal. Under the conditions assumed, the full amount of resistor R9-2 is included in the timing circuits with the result that a minimum dispatching interval is being provided. During the running of the dispatching interval a circuit exists through contacts VDL2-2 for the coil of switch CL, causing this switch to be operated. When the interval expires, inasmuch as no car is at the top terminal, the separation of contacts VDL2-2 breaks this circuit and switch CL drops out, subject to a slight time delay of a few seconds to provide some leeway. This time delay is provided by the discharge of condenser Q2-2. The resultant engagement of contacts CL1-2 completes a circuit through contacts VTO1-2 for the operating coil of switch LA. This switch operates to engage contacts LA2-2 to establish a circuit through contacts EC1-2 and LC2-2 for the holding coil of switch LA, switch EC being operated because, with no car at the top terminal, contacts WT1-2 for each car are engaged. At the same time, contacts CL2-2 engage to complete a circuit through contacts VTO6-2 for the set coil of switch XTO, this switch latching itself in operated condition and engaging contacts XTO2-2.

Upon selection of late car "a" as it arrives at the top terminal, contacts WT2a-2 complete a circuit for the coil of switch CL. The resultant engagement of contacts CL4-2 completes a circuit through contacts XTO2-2 and EC5-2 for the coil of switch VTO, switch EC being maintained energized by way of contacts VDL1-2 after the selection of car "a" and consequent separation of contacts WT1a-2. Switch VTO engages contacts VTO7-2 to establish a self holding circuit. As switch VSDa is operated as soon as car "a" is selected, contacts VSD1a-7 separate, deenergizing switch RAa, so that as soon as the door time interval expires and the doors reach closed positions, the car starts downwardly. Also switch VDL is reoperated, maintaining switch CL operated. The circuit for the coil of switch EC is broken momentarily as switch VDL operates, but is reestablished by the engagement of contacts WT1a-2 as car "a" leaves, the switch being maintained in operated condition by condenser Q1-2.

Also as the car leaves, contacts WT4a-2 separate, restarting the dispatching interval. Inasmuch as contacts LA3-2 are now engaged, the potential of point X is nearer that of line W11, thus increasing the potential across coil VDL-2 and thus providing a longer interval before the next car is due to be dispatched on its downward trip. This also increases the potential across the coil VUL-2 so that a longer interval is provided for dispatching the next car on its upward trip. As a result of the operation of switch VTO, contacts VTO1-2 are separated and contacts VTO2-2 are engaged, awaiting the arrival of the next car at the top terminal.

Assume that the next car, say car "b" also is late in arriving at the top terminal. Switch CL is dropped out at the end of the dispatching interval, subject to the time delay as before. The engagement of contacts CL1-2 now completes a circuit through contacts VTO2-2 and LA1-2 for the operating coil of switch LB. This switch operates to engage contacts LB3-2 to complete a circuit through contacts EC2-2 and LD1-2 for its holding coil. Contacts CL2-2 engage to complete a circuit through contacts VTO5-2 and XTO1-2 for the reset coil of switch XTO, resetting this switch to separate contacts XTO2-2. Upon arrival of car "b" at the top terminal, switch CL is reoperated as a result of the engagement of contacts WT2b-2. This separates contacts CL3-2 to break the circuit for the coil of switch VTO. Also switch VSDb operates so that as soon as the door time interval expires, the doors close and the car is automatically started on its downward trip. The dispatching interval is restarted as the car leaves and inasmuch as contacts LB4-2 are now engaged, a still longer dispatching interval is provided. Also the up dispatching interval is increased.

It is believed that it will be seen that if the next car, say car "d" is late, switch LC is operated to further increase the dispatching intervals, the operations involved being similar to those described for switch LA. Also, if the following car "c" is late, switch LD is operated to still further increase the dispatching intervals, the operations involved being similar to those described for switch LB.

Assume now that with but switches LA, LB and LC operated, the next car, say car "a", arrives at the top terminal before the dispatching interval expires. Under such conditions, switches XTO and VTO are operated. Since the dispatching interval has not expired switch VDL has not dropped out. Thus contacts VDL1-2 are separated so that upon the separation of contacts WT1a-2 as car "a" is selected, the circuit for the coil of switch EC is broken. Switch EC is delayed in dropping out by the discharge of condenser Q1-2, say for half an interval. Assume that switch EC drops out before the time interval expires. Inasmuch as under the assumed conditions contacts VTO3-2 are separated, the separation of contacts EC1-2 breaks the circuit for the holding coil for switch LC. Contacts LC2-2 prevent holding coil LC-2 being maintained energized by way of contacts LB2-2, contacts LB2-2 maintaining holding coil LA-2 energized when contacts EC1-2 separate. Inasmuch as contacts VTO1-2 are separated, the deenergization of the holding coil for switch LC causes this switch to drop out. As a result, contacts LC5-2 separate, raising the potential of point X and thus shortening the dispatching intervals. Also the engagement of contacts EC4-2 completes a circuit for the reset coil of switch XTO, causing the separation of contacts XTO2-2. Thus upon the expiration of the dispatching interval and consequent operation of switch EC, the separation of contacts EC3-2 breaks the circuit for the coil of switch VTO, causing this switch to drop out.

Assume now that the next car, say car "c" is also early. Under the assumed conditions, switches LA and LB are operated, switch VTO is dropped out and switch XTO is reset. The separation of contacts WT1c-2 breaks the circuit for the coil of switch EC. Assuming again that switch EC drops out before the time interval expires, it separates contacts EC2-2. As contacts VTO4-2 are separated, this breaks the circuit for the holding coil of switch LB. As contacts VTO2-2 are separated, switch LB drops out. The holding coil of switch LA is maintained energized by way of contacts VTO3-2, LC2-2 and LA2-2. The separation of contacts LB4-2 raises the potential of point X still further, thus further shortening the dispatching intervals. Also the engagement of contacts EC4-2 causes reoperation of switch XTO. Thus upon the engagement of contacts EC5-2 at the expiration of the dispatching interval, a circuit is reestablished for the coil of switch VTO, causing this switch to operate. It is believed that it will be understood that if the next car is similarly early, switch LA is dropped out to further shorten the dispatching interval.

Resistor R9-2 is chosen to provide a reasonable minimum dispatching interval for light traffic conditions. Then when traffic increases so as to slow the cars, the interval is gradually increased so as to insure regularity of service. As soon as the traffic decreases, the interval is shortened again. With this arrangement the dispatching interval is automatically adjusted in accordance with the intensity of the traffic, thereby providing optimum service. This is especially suitable for installations where traffic conditions vary considerably.

For certain installations, it may be considered desirable to adjust the dispatching interval in accordance with the number of cars in operation. Such operation may be had in the arrangement illustrated by throwing changeover switch CO3-2 into its other position. In order to render the late and early car circuits ineffective with the circuits illustrated, switch CO1-2 is opened, it being understood that these circuits are not provided where only the cars in operation control of the dispatching interval is provided, and vice versa. With the cars in operation control, the potential of point X is determined by the ratio of resistance R10-2 to the effective amount of resistance R11-2. Resistance R11-2 is chosen so that with all cars in operation the minimum dispatching interval suitable for the particular installation is provided.

Assume that all four cars are operating on "continuous call", under which conditions contacts XCS2-2 for each car are separated, providing the minimum dispatching interval. Assume now that one of them, say car "a", is taken out of service. To do so, switch OSa is opened, breaking the circuit for the coil of switch CAa. This switch drops out, separating contacts CA1a-7 to render the starting circuits for car "a" ineffective and separating contacts CA1a-4 to prevent lighting of the hall lanterns for car "a". It also separates contacts CA2a-7, breaking the circuit for the coil of relay XCSa. This relay drops out to engage contacts XCS2a-2, short circuiting a step of resistance R11-2, lowering the potential of point X and thus increasing the dispatching interval to an amount satisfactory for but three cars in operation. Switch XCSa may be caused to drop out for other reasons which will be explained later. Whatever the cause, it engages contacts XCS2a-2 to increase the dispatching interval. The same operation is had should contacts XCS2-2 for any other car engage and, should these contacts for more than one car engage, the short circuiting of additional resistance still further increases the dispatching interval.

It is to be understood that under "continuous call" operation the cars, as they make their trips up and down the hoistway, make stops in response to their car calls and in response to landing calls for their direction of travel. The cars continue operating "continuous call" so long as a landing call remains to be responded to. When all landing calls are answered contacts BLX2-2 separate, breaking the holding circuit for the coil of relay CC, this relay being delayed in dropping out by the discharge of condenser Q5-2. Thus, if the absence of landing calls persists for a certain period, say five seconds, relay CC drops out to throw the system back to "on call" operation.

Assume that conditions are such that relay CC drops out. In doing so it separates contacts CC1-2 to render the dispatching circuits ineffective and engages contacts CC1-3 to render the "on call" circuits effective. It also separates contacts CC1a-5 to restore the control of switch HGa to the car buttons for car "a" and separates contacts CC2-5 to render switches DCC and HCC again effective. It also separates contacts CC1a-7 and engages contacts CC2a-7 to restore the control of switch RAa to switches HJa and LJa, and separates contacts CC3a-7 to remove the control of switch NTa from dispatching. It also engages contacts CC1a-4 and CC3a-4 to remove the control of the hall lanterns for car "a" for the terminal floors from dispatching control. It is to be understood that in the case of the circuts for car "a", like changes are made in the circuits for each of the other cars.

When the circuits are changed back to "on call" operation, all cars not at the bottom terminal are caused to return thereto by the operation of switch LG for that car, the circuit for the coil of the switch for car "a" for example being through contacts MR1a-5, as previously explained. If a car is already at the bottom terminal or if not upon the arrival of a car there it is selected. Assume this to be car "a". The resultant engagement of contacts WB1a-3 completes a circuit through contacts ABC1-3 and WFC1-3 for the upper coil of switch MFa. This switch operates to select car "a" as the middle free car, and as a result of the engagement of contacts MF1a-5, the car is caused to go to the middle free car parking floor as previously explained. Contacts MF2a-5 enable the car to leave if there is a landing call registered. Switch MFa also engages contacts MF3-a to complete a circuit through contacts XM1-3 and XCS1a-3 for the lower coil of this switch, and engages contacts MF2a-2 to cause operation of switch MFC. Contacts MF1a-3 prevent operation of switch ABa as contacts MFC2-3 engage. Contacts MF1a-7 enable the doors if closing at the bottom terminal to be reopened in response to touching the landing button at that floor.

As car "a" leaves the bottom terminal, another car, if there, is selected or, if not, is selected as soon as it arrives. Assume this to be car "c", the resultant engagement of contacts WB2c-3 completes a circuit through contacts MFC2-3 and MF1c-3 for the upper coil of switch ABc. No circuit is completed for the upper coil of switch MFc because contacts MFC1-3 are now separated. Switch ABc operates but inasmuch as no circuit is established to cause car "c" to leave the bottom terminal, it parks at that floor as the active bottom car. Switch ABc engages contacts ABc-3 to complete a circuit through contacts MF4c-3 and XCS2c-3 for the lower coil of switch ABc. It also engages contacts AB2c-2 to complete a circuit for the coil of switch ABC.

The engagement of contact ABC2-3 completes a circuit for the coil of switch XIT. Inasmuch as neither car "b" nor car "d" is the middle free car or active bottom car, contacts MF1b-2, MF1d-2, AB1b-2 and AB1d-2 are engaged. Thus upon operation of switch XIT to engage contacts XIT1b-2 and XIT1d-2, circuits are completed for causing the operation of switches VTb and VTd. As a result, notching relay VDR operates to select one of them, say car "b". The resultant engagement of contacts WT1b-3 completes a circuit through contacts ABC2-3, ITC1-3, AB1b-3, and MF2b-3 for the upper coil of switch ITb. This switch operates to separate contacts IT4b-6 and to engage contacts IT1b-6, causing the car to go to the top terminal instead of the bottom terminal as the inactive top car. It also engages contacts IT1b-3 to complete a circuit through contacts XCS4 for the various cars, and contacts XCS3b-3, MF6b-3 and AB5b-3 for the lower coil of switch ITb and engages contacts IT1b-2 to complete a circuit for the coil of switch ITC. It also separates contacts IT2a-5 to prevent response to landing calls for floors below.

Switch ITC operates to separate contacts ITC1-3, breaking the circuit for the coil of switch XIT and for the operating coil of switch ITb. Switch ITb is held in by its lower coil but switch XIT drops out to separate contacts XIT1d-2, causing the dropping out of switch VTd. Inasmuch as car "d" was not selected as a result of the initial operation of switch XIT, its switch ITd was not operated so that car "d" returned to the bottom terminal under the control of contacts corresponding to contacts MF3a-5 and IT4a-5 for car "a". Upon its arrival at the bottom terminal it becomes the inactive bottom car.

Assume now that the active bottom car "c" is started in the up direction in response to a seventh floor car call. As it passes a certain floor which may be the middle free car parking floor, its brush XMBc-3 engages contacts XMCc-3, completing a circuit through contacts AB4c-3 and contacts H1c-3 for the upper coil of switch XM. This switch operates to separate contacts XM1-3, breaking the circuit for the lower coil of switch MFa. As contacts ABC1-3 are now separated so that the upper coil of switch MFa is deenergized, the separation of contacts XM1-3 causes the dropping out of switch MFa. The operation of switch XM is only momentary as brush XMBc-3 runs off the contact or, if a stop is made at the floor for which contact XMCc-3 is provided, as contacts H1c-3 separate. Upon dropping out switch XM reengages contacts XM1-3 which completes a circuit through contacts AB2c-3, MFC3c-3

(now engaged as a result of the dropping out of switch MFa) and XCS1c-3 for the lower coil of switch MFc. Switch MFc operates to separate contacts MF4c-3, breaking the circuit for the lower coil of switch ABc. As the circuit for the upper coil of switch ABc is open at contacts ABC1-3, switch ABc drops out. The car "c" no longer is the active bottom car and becomes the middle free car and as it finishes answering calls it is caused to go to the middle free car parking floor. As a result of the engagement of contacts MF3a-5, a circuit is set up to cause the return of car "a" to the bottom terminal, this operation being delayed in case it is answering calls at the time until it has answered its highest call. It is to be understood that car "a" responds to its car calls and down landing calls on its return to the main landing.

As soon as car "c" left the main landing the inactive bottom car "d" was selected. Thus its contacts WB2d-3 are engaged. Upon the operation of switch MFc, switch MFC is reoperated to engage contacts MFC2-3. This completes a circuit for the upper coil of switch ABd through contacts ABC1-3 (engaged as a result of the dropping out of switch ABc), WB2d-3 and MF1d-3. No circuit is completed for the upper coil of switch ABc as contacts MF1c-3 are separated. Thus car "d" is selected as the new active bottom car when car "c" is selected as the new middle free car. When car "a" arrives at the bottom terminal it becomes the inactive bottom car.

Should car "d" be out of service at the time that car "c" becomes the new middle free car, car "a" becomes the new active bottom car as it arrives at the bottom terminal. If for some reason car "a" fails to return to the bottom terminal when car "d" is out of service, the inactive top car "b" is caused to come to the bottom terminal and become the new active bottom car. This is effected by switch XCSa. Under the conditions assumed, if car "a" is answering calls at the time, either switch HJa or switch LJa acts to break the circuit for the coil of switch RAa. If not answering calls, switch LJa is operated as the main landing return circuit is set up, thus breaking the circuit for the coil of switch RAa. In either case, contacts RA2a-7 separate in the circuit for the coil of relay XCSa. This relay is delayed in dropping out for a certain time interval, say fifteen seconds, by the discharge of condenser Q2a-7. If the car fails to start or restart within that time and engage contacts H3a-7 to reconnect coil XCSa-7 to the supply lines, the relay drops out, removing car "a" from service. Inasmuch as contacts MR1a-3 are separated as a result of the main landing return circuit being set up, the separation of contacts XCS4a-3 as a result of the dropping out of relay XCSa breaks the circuit for the lower coil of switches ITb. Inasmuch as contacts ITC1-3 also are separated, switch ITb drops out to engage contacts IT4b-6, causing car "b" to discontinue being the inactive top car and to come to the bottom terminal to become the new active bottom car.

Assume as before that car "a" is the middle free car, that car "c" is the active bottom car and that car "a" is returned to the bottom terminal in response to a car call. As it arrives at that landing, brush MLBa-7 engages contact MLCa-7 to complete a circuit for the coil of switch MLa. This switch operates to engage contacts ML1a-3, completing a circuit through contacts MF5a-3 and UD1a-3 for the lower coil of switch XM. This switch operates and, as the direction is changed to up to cause the separation of contacts UD1a-3, drops out again. This momentary operation of switch XM causes changeover of the middle free car to car "c" as set forth above, with the result that car "c" goes to the middle free car parking floor. Either car "a" or car "d" is selected as the active bottom car as car "c" leaves the bottom terminal.

Should the middle free car fail to respond to a call within a certain time interval, it is automatically removed from service and another car becomes the middle free car. Assume that car "a" is the middle free car and is parked, and that a landing call is registered. This causes contacts RA2a-7 to separate, breaking the circuit for the coil of relay XCSa as above described. If the car fails to start and engage contacts H3a-7 to reconnect coil XCSa-7 to the supply lines within the time interval of relay XCSa, the relay drops out. As a result contacts XCS1a-3 separate to cause the dropping out of switch MFa, causing car "c" to become the middle free car and answer the call and car "d" to become the active bottom car, as above described. The same action is had when the middle free car is parked at the middle free car parking floor if someone touches a landing button at that floor and the doors fail to open within the given period. This is caused by the separation of contacts NT4a-7 which if they remain open for this period causes the dropping out of switch XCSa. As the call remains registered owing to the fact that contacts DCLa-5 and AS3a-5 are separated under the assumed conditions, as soon as car "c" becomes the new middle free car, it is started in the up direction to answer the call.

A similar operation is had if the doors of the active bottom car "c" fail to open within the given period after touching the landing button at the main landing. The resultant separation of contacts XCS2c-3 breaks the circuit for the lower coil of switch ABc and, as contacts ABC1-3 are separated, switch ABc drops out. Also contacts XCS1c-2 separate, breaking the circuit for the coil of relay VBc with the result that notching relay VUR selects car "d". As switch ABC drops out to engage contacts ABC1-3 as a result of the dropping out of switch ABc, the engagement of contacts WB2d-3 consequent upon the selection of car "d" causes the operation of switch ABd to select car "d" as the new active bottom car. So long as this car was the inactive bottom car, the touching of the button was ineffective to cause operation of switch NT for car "d" as contacts for car "d" corresponding to contacts ML1a-7 were separated. Upon becoming the active bottom car however, its contacts corresponding to contacts AB1a-7 are engaged so that the circuits are effective to open the doors for car "d".

Should, under the assumption where middle free car "a" is returned to the bottom terminal in response to a car call, or under the assumption where it fails to respond to a call within the time interval of relay XCSa, the active bottom car "c" fails to take the place of car "a", the new active bottom car, which will be car "d" where car "a" fails to respond and will be assumed to be car "d" where there is a selection between cars "a" and "d", is caused to take the place of car "c", and car "c" is removed from service. The failure of car "c" is signified by the dropping out of relay XCSc. The resultant separation of contacts XCS1c-3 breaks the circuit for the lower coil of switch MFc-3, causing this switch to drop out. This in turn causes the dropping out of switch MFC to engage contacts MFC3d-3 completing a circuit through contacts XM1-3, AB2d-3 and XCS1d-3 for the coil of switch MFd. Switch MFd operates to cause car "d" to become the new middle free car and thus to take the place of car "a".

When this operation takes place under conditions where car "a" failed to respond, inasmuch as there is no car left at the bottom terminal to become the new active bottom car and thus no switch AB is in operated condition, switch ABC is dropped out with the result that its contacts ABC3-3 separate to break the circuit for the coil of switch ABD. This switch is delayed slightly in dropping out by the discharge of condenser Q1-3 and upon dropping out engages contacts ABD2b-6 to complete a circuit through contacts IT3b-6 for the coil of switch LGb-6. The operation of switch LGb causes the starting of the car on its downward trip as has been previously explained in the case of car "a". Upon reaching the bottom terminal, car "b" becomes selected as the new active bottom car. Incident to this operation, contacts AB5b-3 separate to break the circuit for the lower coil of switch ITb causing this switch to drop out and thus avoid returning the car to the top terminal.

If in the above example car "d" also failed to take the place of car "a", car "b" is selected as the new middle free car. Upon the separation of contacts XCS1d-3, switch MFd is dropped out so that upon the arrival of car "b" at the bottom terminal, it is immediately selected by the notching device as the new middle free car. Incident to this operation, contacts MF6b-3 separate to break the circuit for the lower coil of switch ITb to cause this switch to drop out and thus avoid returning the car to the top terminal.

Where the failure takes place at the bottom terminal as a result of the doors of the then active bottom car failing to open within the time interval provided for switch XCS for that car, should the doors likewise fail to open on the inactive bottom car, within the time interval provided by the switch XCS for the car, when it becomes the new active bottom car the inactive top car is brought to the bottom terminal to become the new active bottom car as explained above. Should this car, say car "b", fail to come to the bottom terminal, the separation of its contacts XCS3b-3 breaks the circuit for the lower coil of switch ITb, causing this switch to drop out. As a result switch ITC is dropped out and engages contacts ITC1-5 which, inasmuch as contacts ABD1-5 are engaged as there is no active bottom car, connects the coil of switch LJa across resistor RUL1-5. As a result, switch LJa operates to cause the operation of the middle free car "a" to answer the first floor landing call.

Thus it is seen that should the middle free car fail within a certain period to respond to a landing call for a floor above the main landing or to open its doors when parked and a landing button is touched at the parking floor, the active bottom car becomes the new middle free car and answers the call and another car becomes the new active bottom car. Similarly should the doors of the active bottom car when parked fail within a certain period to open when the landing button at that floor is touched, the inactive bottom car becomes the new active bottom car and its doors are opened.

It is, of course, improbable that there will be failure of response of more than one car at a time but it will be taken car of should it ever arise. More likely, one or more cars, i.e., the inactive bottom car or inactive top car or both, will be out of service at the time a failure takes place. Taking cars out of service is effected by opening their OS switches as previously set forth, causing their switches XCS to be dropped out. Thus for example with the inactive bottom car "d" out of service at the time the doors of the active bottom car "c" fail to open, the dropping out of switch ABc at the expiration of the time interval of switch XCSc causes the dropping out of switch ABC and thus switch ABD as there is not a car in service at the bottom terminal to become the new active bottom car. As a result the inactive top car is started immediately to come to the bottom landing to answer the call. Should the inactive top car "b" also be out of service, switch ITC is dropped out so that the dropping out of switch ABD causes the immediate starting of the middle free car "a" to answer the call.

The cars may be operated with attendants by throwing throw-over switches TO for the individual cars into "with attendant" positions "w". As to car "a" for example, the throw over of switch TOa-2 causes the cars to operate as on a "continuous call" basis. The throw over of switch TO2a-4 renders up and down dispatching lights UDLa-4 and DDLa-4 effective to give dispatching signals to the attendants to start the cars, subject to direction contacts UD1a-4 and UD2a-4 and dispatching switch contacts VSD1a-4. The throw over of switch TO1a-7 renders the operation of switch RAa and thus the starting of the car subject to starting button SBa-7 in the car. The throw over of switch TO4a-7 renders the dropping out of switch NTa subject to the dropping out of switch RAa. Thus the starting button also effects the closing of the doors. The throw over of switch TO5a-7 renders resistor R6a-7 ineffective, thus speeding up the door closing operation under with attendant operation. The throw over of switch TO1a-4 causes the lighted hall lantern to be extinguished when the start button is pressed. The throw over of switch TO2a-7 renders the non-stopping of the car subject to the pressing of non-stop button NSBa-7 in the car. The throw over of switch TO6a-7 renders reversal buttons URBa-7 and DRBa-7 effective. Also the throw over of switch TO6a-7 and of switch TO7a-7 renders lowest call reversal circuits ineffective. The throw over of switch TO3a-7 renders switch XCSa subject to the potential switch.

From the above description it will be seen that there is provided a plural elevator system in which the cars may be operated either with or without attendants. On "without attendant" operation the cars may be operated on "on call" operation or "continuous call" operation. The cars are dispatched on their upward and downward trips on both "with attendant" operation and on "without attendant continuous call" operation. The dispatching on "with attendant" operation is effected by giving dispatching signals to the cars whereupon the attendants start the cars. On "without attendant" operation, the dispatching is effected by automatically starting the cars.

On "without attendant" operation the system operates "on call" until service demand conditions dictate the switch over to "continuous call" operation. On "on call" operation, the middle free car parks at a selected middle free car parking floor, the active bottom car parks at the bottom terminal and, in a four car installation, the other two cars park as inactive cars, one at the bottom terminal and one at the top terminal. This provides standby cars for out of service "on call" cars and insures satisfactory distribution of the cars for throw over to continuous call operation. The cars park with the hoistway doors and car doors closed.

Upon the registration of a landing call for a floor above the lower terminal other than the floor at which the middle free car is parked, the middle free car is started in a direction toward that floor and upon arrival thereat is brought to a stop and its doors automatically open. The intending passenger enters the car and presses the car button for his destination. The doors close and the car takes the passenger to his destination where it is brought to a stop and the doors open, permitting the passenger to leave the car. If other calls are registered, the car stops at each floor for which car calls are registered and for which landing calls for the direction in which the car is set to travel are registered. It continues to travel in the same direction after each stop until it stops at the farthest floor in that direction for which a call is registered. This may be a landing call for the opposite direction. When all calls are responded to, the car automatically returns to the middle free car parking floor. If while the car is on its way to the parking floor, a landing call is registered for a floor beyond, the car passes the parking floor and proceeds to the floor of call.

The active bottom car serves incoming traffic. When it is started in the up direction in response to a car call, it assists the middle free car in answering landing calls. If the car does not reach a certain floor, it returns to the bottom terminal as the active bottom car upon answering its highest call, responding to calls on the way down. If on its upward trip it does pass a certain floor, it becomes the new middle free car and the previous middle free car is returned to the bottom terminal. A new active bottom car is selected, usually the inactive bottom car. A changeover is also effected when the middle free car is returned to the bottom terminal. In such event, the active bottom car becomes the new middle free car and goes to the middle free car parking floor and either the previous middle free car or the inactive bottom car becomes the new active bottom car.

Should a car fail to respond within a certain time interval, it is removed from service and another car is caused to take its place. This failure may be manifested in failure to start in response to a call for another floor or failure to open its doors in response to touching a button at the landing where parked. In the case of the middle free car, the active bottom car becomes the new middle free car and the inactive bottom car becomes the new active bottom car. In the case of the active bottom car, the inactive bottom car becomes the new active bottom car. Should in either case the car, which should take the place of the car which failed to respond, fail to do so, another car is caused to take the place of the car which failed to respond.

Should certain service demand conditions arise, the system is automatically switched over to "continuous call" operation. This has been illustrated as occurring upon the registration of one or more than one overlapping landing calls for a certain period of time. Also this time period is shortened in accordance with the number of landing calls in registration. In addition, the changeover is effected in response to the automatic load nonstop operation of a car, provided a landing call is in registration. When the system is thrown over to "continuous call" operation, the cars are selected for dispatching in the order of their arrival at the terminals. The dispatching operations occur at the expiration of given time intervals. When the interval expires, the doors close automatically and the selected car starts on its trip to the opposite terminal.

When on "continuous call" operation, the dispatching interval is adjusted automatically in accordance with whether the cars are early or late on a round trip basis. If traffic increases so as to slow the cars, the interval is gradually increased and, as soon as traffic decreases, the interval is shortened. Also, the dispatching interval may be automatically adjusted in accordance with the number of cars in service.

Under "continuous call" operation, when all landing calls have been responded to for a certain interval of time, the system automatically changes back to "on call" operation. When this occurs, all cars not at the bottom terminal are started to return thereto. A car at the bottom terminal or the first car to arrive there is caused to become the middle free car and go to the middle free car parking floor. When this car leaves the bottom terminal, another car there or the next car to arrive there is selected as the active bottom car and remains at that floor. When the active bottom car is selected, one of the two remaining cars is selected to go to the top terminal as the inactive top car and the other car proceeds to the bottom terminal and becomes the inactive bottom car.

While the invention has been described in connection with an installation of four elevators serving ten floors, it is to be understood that it is applicable for installations of other numbers of elevators and of other numbers of floors. Also, it is applicable to installations not having "with attendant" operation. The invention is applicable to installations having basement service in which case the active bottom car would preferably serve the basement. In addition, late car reversal operation may be provided when operating under dispatching, as for example as disclosed in the patent to Glaser and Hornung No. 2,589,242. It is contemplated that certain features of the invention may be used in connection with apparatus and circuits different from those specifically described and also in connection with other forms of elevator control. This includes the dispatching mechanism which may vary, as for example effecting dispatching at regular time intervals instead of measuring the time from the departure of the cars. Other arrangements for registering calls may be employed. Various alterations may be made, and various operations may be modified.

For example, by throwing over switch CO2-2 to its upper position, switch VUD-2 is operated as indicative of a form of control other than "continuous call" which may be had when service demand changes. By closing changeover switch CO-7 (one for each car), the middle free car, upon responding to a down landing call, is caused to proceed to the bottom terminal. This is effected by switch LYa for car "a", which when a down call is picked up has its operating coil energized by way of contacts XSM2a-7 and PR1a-7. Upon operation, it engages contacts LY1a-7 to become self holding and engages contacts LY1a-5 to cause the bottom terminal circuit to be set up. Upon arriving at the bottom terminal, switch LYa is dropped out by the separation of contacts PR1a-7.

With changeover switches CO1-8 and CO2-8 closed, the system is arranged so that if, under "continuous call" operation, no car starts within a certain interval, say forty seconds, the system is thrown over to an instant start operation. When on continuous call, contacts CC1-8 are separated so that the coil of switch ACT is subject to the H1-8 contacts of the various cars. Should no car start within the time interval after the last to run car stops, switch ACT drops out to separate contacts ACT1-2 and ACT1-3, disconnecting the dispatching circuits, enabling the cars to run wild in response to landing calls. Also contacts ACT2-8 separate in the energizing circuit for the coil of switch ACX. This switch drops out say in five seconds, engaging contacts ACT1-8 to retest the circuit for the coil of switch ACT. When switch ACT drops out it engages contacts ACT3-8 to light signal light IL-8 and sound buzzer BZ-8. These features may be rendered ineffective by opening switch CO1-8 or the test circuit may be rendered ineffective by opening switch CO2-8. Similar operation may be had on "on call" operation and is illustrated as provided by contacts BLX1-8.

As another example of variations that may be made, the control of the operation of switch TT may vary, especially with respect to the conditions which cause its operation and the various time variations employed.

Also, the system may be arranged so that the cars do not have to proceed to the bottom terminal to be selected upon changeover from "continuous call" to "on call" operation.

It is not intended to set forth all the variations that may be made, but it is contemplated that many of the features of the invention disclosed may be carried out in other ways and may be used in connection with apparatus and circuits different from those specifically described and that many apparently widely different embodiments of the invention can be made without departure from the spirit and scope of the invention. It is therefore intended that all matter contained in the above description or shown in the accompanying drawings shall be interpreted as illustrative and not in a limiting sense.

What is claimed is:

1. A control system for a plurality of elevator cars serving a plurality of landings including terminal landings comprising; call registering means for each of said landings; means for registering traffic conditions; means responsive to said traffic conditions registering means under intermittent traffic conditions for causing operation of one or more of the cars on an intermittent basis; dispatching mechanism for the cars; and means responsive to said traffic conditions registering means under greater traffic conditions for changing over the operation to cause the cars to be dispatched by the dispatching mechanism from at least one of the terminal landings on a time basis.

2. A control system for a plurality of elevator cars serving a plurality of landings including terminal landings comprising; call registering means for each of said landings; means responsive to actuated call registering means for registering demand for service; means responsive to said service demand registering means under conditions of intermittent service demand registered by said call registering means for causing operation of one or more of the cars on an intermittent basis; mechanism for dispatching said cars on a time basis; and means responsive to said service demand registering means under conditions of greater service demand registered by said call registering means for changing over the operation to cause the cars to be dispatched by said dispatching mechanism from at least one of the terminal landings on a time basis.

3. A control system for *a* plurality of elevator cars serving a plurality of landings including terminal landings comprising; call registering means for each of said landings; means responsive to actuated call registering means for registering demand for service; means for causing one of said cars to operate as under collective control in response to calls for certain of said landings under certain service demand conditions; and means responsive to said service demand registering means under other service demand conditions of registered calls for causing automatic starting of said cars from at least one of said terminal landings on a time basis.

4. A control system for a plurality of elevator cars serving a plurality of landings including terminal landings comprising; call registering means for each of said landings; means for causing the calls that are registered to be answered by the cars that are in operation; means for causing operation whereby but one of said cars is started in operation in response to the registration of a call; dispatching means for causing operation whereby said cars are automatically started from a terminal landing on a time basis; and call time measuring means subject to said call registering means for determining which of such operations is had.

5. A control system for a plurality of elevator cars serving a plurality of landings including terminal landings comprising; call registering means for each of said landings; means responsive to actuated call registering means for registering demand for service; means responsive to said service demand registering means under conditions of intermittent service demand registered by said call registering means for causing operation of one or more of the cars on an intermittent basis; mechanism for dispatching said cars on a time basis; load weighing means for each car; and means controlled by said load weighing means for a car at the lower terminal landing under conditions where the load taken in that car reaches a certain amount for changing over the operation to cause the cars to be dispatched by said dispatching mechanism from such terminal landing on a time basis.

6. A control system for a plurality of elevator cars serving a plurality of landings including terminal landings comprising; call registering means for each of said landings; means for causing the calls that are registered to be answered by the cars that are in operation; load weighing means for each car responsive to a certain load in the car; automatic load non-stop means for each car responsive to operation of said load weighing means for that car for causing the car to run past landings for which calls are registered; means for causing operation whereby but one of said cars is started in operation in response to the registration of a call; dispatching means for causing operation whereby said cars are automatically started from a terminal landing on a time basis; and means responsive to the operation of said load weighing means for said one car and an actuated call registering means for throwing over the cars to the control of said dispatching means.

7. A control system for a plurality of elevator cars serving a plurality of landings including terminal landings comprising; call registering means for each of said landings; means for causing one of said cars to serve as a free car and park at an intermediate landing; means responsive to the actuation of a call registering means to register a call for a landing other than said intermediate landing and the bottom terminal landing for starting the free car in operation; means for causing said free car to stop at landings above the lower terminal landing in response to actuated call registering means for such landings; means responsive to actuated call registering means for registering demand for service; and means responsive to said service demand registering means under certain service demand conditions of registered calls for discontinuing such free car operation and for causing automatic starting of said cars from said terminal landings on a time basis.

8. A control system for a plurality of elevator cars serving a plurality of landings including terminal landings comprising; call registering means for each of said landings; means for causing one of said cars to serve as a free car and park at an intermediate landing and other cars to park at least one at each of said terminal landings; means responsive to the actuation of a call registering means to register a call for a landing other than the one at which said free car is parked and the bottom terminal landing for starting the free car in operation; means for causing said free car when started in operation to stop at landings above the lower terminal landing in response to actuated call registering means for such landings; dispatching means operable to effect automatic starting of said cars from said terminal landings on a time basis; means responsive to actuated call registering means for registering demand for service; and means responsive to said service demand registering means under conditions of sustained demand for service for a predetermined period of time for throwing over the operation of said cars to the control of said dispatching means.

9. A control system for a plurality of elevator cars serving a plurality of landings including terminal landings comprising; call registering means for each of said landings; means for causing the cars that are in operation to answer registered calls; means for causing one of said cars to serve as a free car and park at an intermediate landing and other cars to park one at the bottom terminal landing as an active bottom car and another at the top terminal as an inactive top car; means responsive when all cars are parked to the actuation of a call registering means to register a call for a landing other than the one at which said free car is parked and the bottom terminal landing for starting the free car in operation; dispatching means operable to effect automatic starting of said cars from each terminal landing upon expiration of a predetermined time interval after the departure from that terminal landing of the next preceding car; means controlled by the time that overlapping calls are registered by actuated call registering means; and means responsive to actuation of said time control means while said free car is responding to calls for throwing over the operation of said cars to the control of said dispatching means.

10. A control system for a plurality of elevator cars serving a plurality of landings comprising; call registering means for each of said landings; means for causing the cars that are in operation to stop in response to actuated call registering means at floors for which calls are registered; dispatching mechanism operable to effect automatic starting of said cars from a terminal one of said landings on a time basis; means responsive to actuated call registering means for registering demand for service; and means responsive to said service demand registering means under certain service demand conditions for causing operation of said cars under the control of said dispatching mechanism and under conditions where the service demand decreases to a certain point changeover of the operation of the system to cause one of the cars to answer subsequent calls as a free car and the other car or cars to park at one or both terminal landings.

11. A control system for a plurality of elevator cars serving a plurality of landings comprising; call registering means for each of said landings; means for causing the cars that are in operation to stop in response to actuated call registering means at floors for which calls are registered; dispatching mechanism operable to effect automatic starting of said cars from a terminal one of said landings on a time basis; means responsive to actuated call registering means for registering demand for service; and means responsive to said service demand registering means under certain service demand conditions for causing operation of said cars under the control of said dispatching mechanism and under conditions where no service demand exists changeover of the operation of the system to cause one of the cars to park at an intermediate landing as a free car, another car to park at the bottom terminal landing as an active bottom car and still another car to park at the top terminal landing as an inactive top car.

12. A control system for a plurality of elevator cars serving a plurality of landings including terminal landings comprising; call registering means for each of said landings; means for causing the cars that are in operation to stop in response to actuated call registering means at floors for which calls are registered; dispatching mechanism operable to effect automatic starting of said cars from a terminal landing on a time basis; means responsive to actuated call registering means for registering demand for service; and means responsive to said service demand registering means under certain service demand conditions for causing operation of said cars under the control of said dispatching mechanism and under conditions where no service demand exists changeover of the operation of the system to cause a car at the bottom terminal landing, or if none is there the first car to arrive, to become a free car and go to an intermediate landing to park, the next car to arrive at the bottom terminal landing to park there as an active bottom car and another car to go to the top terminal landing and park there as an inactive top car.

13. A control system for a plurality of elevator cars serving a plurality of landings including terminal landings comprising; call registering means for each of said landings; means for causing the cars that are in operation to stop in response to actuated call registering means at floors for which calls are registered; dispatching mechanism operable to effect automatic starting of said cars from each terminal landing on a time basis; means responsive to actuated call registering means for registering demand for service; means responsive to said service demand means for causing under conditions where there is a predetermined demand for service existing for a predetermined period of time operation of said cars under the control of said dispatching mechanism and under conditions where said demand decreases to a certain point changeover of the operation of the system to cause the cars to proceed to the bottom terminal landing, a car at the bottom landing, or if none there the first car to arrive, to become a free car and go to an intermediate landing to park, the next car to arrive at the bottom terminal landing to park there as an active bottom car and another car to go to the top terminal landing and park there as an inactive top car; and means responsive when such changeover takes place to an actuated call registering means for a landing other than the one at which said free car is parked, if parked, and the bottom terminal landing for starting the free car in operation to answer calls.

14. A control system for four or more elevator cars serving a plurality of landings including terminal landings comprising; call registering means for each of said landings; means for causing the cars that are in operation to stop in response to actuated call registering means at floors for which calls are registered; dispatching means operable to effect automatic starting of said cars from each terminal landing upon expiration of a predetermined time interval after the departure from that terminal landing of the next preceding car; timed means responsive to said call registering means and operable upon the expiration of a certain time interval after all calls are answered to changeover the operation of the system to cause the cars to proceed to the bottom terminal, a car at the bottom terminal landing, or if none there the first car to arrive, to become a free car and go to an intermediate landing to park, the next car to arrive at the bottom terminal landing to park there as an active bottom car, a car to go to the top terminal landing and park there as an inactive top car and a car to park at the bottom terminal landing as an inactive bottom car; and means responsive when such changeover takes place to the actuation of a call registering means to register a call for a landing other than the one at which said free car is parked, if parked, and the bottom terminal landing for starting the free car in operation.

15. A control system for a plurality of elevator cars serving a plurality of landings comprising; call registering means for each of said landings; means for causing the cars that are in operation to stop in response to actuated call registering means at floors for which calls are registered; dispatching mechanism operable to effect automatic starting of said cars from a terminal one of said landings on a time basis; non-start means responsive to no car starting within a certain time interval after the last to run car stops; and means responsive to operation of said non-start means to changeover the operation to enable the cars to run wild in response to calls until the condition is corrected.

16. A control system for a plurality of elevator cars serving a plurality of landings comprising; call registering means for each of said landings; means for causing the cars that are in operation to stop in response to actuated call registering means at floors for which calls are registered; dispatching mechanism operable to effect automatic starting of said cars from a terminal one of said landings on a time basis; non-start means responsive to no car starting within a certain time interval after the last to run car stops; means responsive to operation of said non-start means to remove the control of the cars from the dispatching mechanism and to cause all of the cars to start in response to calls until the condition is corrected; and means for testing said non-start means upon expiration of a further time interval to determine whether said condition has been corrected.

17. A control system for a plurality of elevator cars serving a plurality of landings comprising; down call registering means for each of said landings above the bottom terminal one of said landings; means for causing one of said cars to serve as a free car and park at an intermediate landing selected as the free car parking floor; means responsive to the actuation of a down call registering means for a landing below said parking floor for starting said free car in the down direction; means for causing said free car when travelling in the down direction to stop in response to actuated down call registering means at landings for which down calls are registered thereby; and means responsive to said free car stopping means upon that car answering the first reached down call on its downward trip under conditions where an additional down call is registered for a landing below for causing the car to continue to travel in the down direction after each subsequent stop until it reaches the bottom terminal landing.

18. A control system for a plurality of elevator cars serving a plurality of landings comprising; down call registering means for each of said landings above the bottom terminal one of said landings; means for causing one of said cars to serve as a free car and park at an intermediate landing selected as the free car parking floor; means responsive to the actuation of a down call registering means for a landing other than the one at which the free car is parked for starting said free car in operation toward the floor for which the call is registered; means for causing said free car when travelling in the down direction to stop in response to actuated down call registering means at landings for which down calls are registered thereby and when travelling in the up direction to stop in response to an actuated down call registering means at the landing for which a down call is registered thereby provided that is the highest call; and means responsive to the initiating of a stop of said free car in either direction in response to a down call for irrevocably causing the car to travel in the down direction after each stop until it reaches the bottom terminal landing.

19. A control system for a plurality of elevator cars serving a plurality of landings including terminal landings comprising; up call registering means for each of the intermediate ones of said landings; down call registering means for each of the intermediate ones of said landings; means for causing one of said cars to serve as a free car and park at an intermediate landing selected as the free car parking floor; means responsive to the actuation of any of said up call registering means or down call registering means for a landing other than said free car parking floor for starting the free car in operation; means for causing said free car when travelling in the up direction to stop in response to actuated up call registering means at landings for which up calls are registered thereby and when travelling in the down direction to stop in response to actuated down call registering means at landings for which down calls are registered thereby; and means responsive, when said free car is the only car responding to calls, to operation of said free car stopping means to initiate the stopping of that car in response to an actuated up call registering means under conditions where no further calls are to be responded to for causing that car to return to said parking floor and to initiate the stopping of that car in response to an actuated down call registering means for causing that car to remain set for downward travel after each stop until that car reaches the bottom terminal landing.

20. A dispatching system for a plurality of elevator cars comprising; means for providing time intervals for dispatching; dispatching mechanism for said cars for dispatching the cars from a given terminal upon the expirations of time intervals provided by said time interval means; means for determining whether the cars are early or late in arriving at said terminal with respect to the expirations of said time intervals; and means responsive only to said early or late car determining means independent of the positions of the other cars for controlling operation of said time interval means to adjust the extent of said interval.

21. A dispatching system for a plurality of elevator cars comprising; means for providing time intervals for dispatching; dispatching mechanism for said cars for dispatching the cars from a given terminal upon the expirations of time intervals provided by said time interval means; means for determining whether the cars are early or late in arriving at said terminal with respect to the expirations of said time intervals; and means responsive only to said early or late car determining means regardless of the positions of the other cars for controlling operation of said time interval means to progressively shorten said interval as successive cars are early in arriving at said terminal and to progressively lengthen said interval as successive cars are late in arriving at said terminal; and timing means for providing leeway to prevent said late or early car determining means in case of a late car from affecting said interval when the lateness does not exceed a certain amount and in case of an early car from affecting said interval when the earliness does not exceed a certain amount.

22. In an elevator system, a structure having a plurality of floors to be served by elevator cars, a plurality of elevator cars, means mounting the elevator cars for movement relative to the structure for serving the floors, said system normally controlling the elevator cars to provide a first predetermined service for the floors which is substantially balanced in the directions of travel of the cars, means operable for conditioning the system to control the elevator cars to provide a second predetermined service for the floors wherein preference is given for travel in a predetermined direction, and means responsive to a predetermined demand for service in said predetermined direction from floors of the structure while the system is providing said first predetermined service for operating the conditioning means to condition the system to control the elevator cars to provide the second predetermined service for the floors.

23. In an elevator system, a structure having a plurality of floors to be served by elevator cars, a plurality of elevator cars, means mounting the elevator cars for movement relative to the structure for serving the floors, control means for controlling the elevator cars to provide substantially balanced service for the floors in the two directions of travel of the elevator cars, said control means including a dispatcher system operating to dispatch the elevator cars from upper and lower terminal floors at intervals tending to maintain said substantially balanced service, and means responsive to a predetermined demand for service in a predetermined direction from the floors for modifying said control means to provide a preponderance of service in said predetermined direction for said floors by the elevator cars.

24. In an elevator system, a structure having a plurality of floors to be served by elevator cars, a plurality of elevator cars, means mounting the elevator cars for movement relative to the structure for serving the floors, first call means for registering calls for service in a first direction of travel from said floors, second call means for registering calls for service in a second direction of travel from said floors, control means for operating said elevator cars for travel in said first and second directions, said control means including stopping means responsive to registration of a call at one of the floors for service for stopping the first available one of the elevator cars to approach the floor at which the call is registered in the direction of travel of the registered call, said control means providing substantially balanced service for said calls registered by the first and second call means, and demand means responsive to a predetermined demand for service from the first call means for modifying the control means to provide a preponderance of service by the elevator cars in said first direction of travel.

25. In an elevator system, a structure having a plurality of floors to be served by elevator cars, a plurality of elevator cars, means mounting the elevator cars for movement relative to the structure for serving the floors, first call means for registering calls for service in a first direction of travel from said floors, second call means for registering calls for service in a second direction of travel from said floors, control means for operating said elevator cars for travel in said first and second directions, said control means including stopping means responsive to registration of a call at one of the floors for service for stopping the first available one of the elevator cars to approach the floor at which the call is registered in the direction of travel of the registered call, said control means providing substantially balanced service in the two directions of travel for said calls registered by the first and second call means, selecting means automatically effective during the operation of the elevator system to carry passengers for selecting a first period wherein said substantially balanced service is to be provided and a second period wherein a preponderance of elevator service is to be provided in the first direction of travel, and modifying means automatically responsive to operation of the selecting means to select the second period for modifying the control means to provide a preponderance of elevator service by the elevator cars in said first direction of travel.

26. In an elevator system, a structure having a plurality of floors to be served by elevator cars, a plurality of elevator cars, means mounting the elevator cars for movement relative to the structure for serving the floors, first call means for registering calls for service in a first direction of travel from said floors, second call means for registering calls for service in a second direction of travel from said floors, control means for operating said elevator cars for travel in said first and second directions, said control means including stopping means responsive to registration of a call at one of the floors for service for stopping the first available one of the elevator cars to approach the floor at which the call is registered in the direction of travel of the registered call, said control means providing substantially balanced service in the two directions of travel for said calls registered by the first and second call means, selecting means automatically effective during the operation of the elevator system to carry passengers for selecting a first period wherein said substantially balanced service is to be provided and a second period wherein a preponderance of elevator service is to be provided in the first direction of travel, and a third period wherein said substantially balanced service is again to be provided, and modifying means automatically responsive to operation of the selecting means to select the second period for modifying the control means to provide a preponderance of elevator service by the elevator cars in said first direction of travel, said modifying means being responsive to selection by the selecting means of said third period for restoring the control means to provide substantially said balanced service.

27. In an elevator system for carrying passengers, a structure having a lower dispatching floor, a plurality of intermediate floors above the lower dispatching floor, and an upper dispatching floor above the intermediate floors, a plurality of elevator cars, means mounting the elevator cars for movement relative to the structure for serving the floors, motive means for moving the elevator cars relative to the structure, up-call means for registering calls for elevator car service from each of a plurality of the floors of said structure in the up direction, down call means for registering calls for elevator car service from each of a plurality of the floors of said structure in the down direction, control means cooperating with the motive means and the call means in a first operation for stopping each of the elevator cars at each of the floors reached by each of the elevator cars during up travel thereof for which a call is registered by the up-call means and at each of the floors reached by each of the elevator cars during down travel thereof for which a call is registered by the down call means, upper dispatching means for dispatching elevator cars in succession from the upper dispatching floor, lower dispatching means for dispatching elevator cars in succession from the lower dispatching floor, the dispatching means and the control means cooperating to provide a first predetermined balanced service in the two directions of travel for said calls registered by the first call means and the second call means, said elevator cars during said balanced service being dispatched successively substantially at intervals from the lower dispatching floors for upward movement and said elevator cars during said balanced service being dispatched successively substantially at intervals from the upper dispatching floor for downward movement, selecting means automatically effective during the operation of the elevator system for selecting a first period wherein said substantially balanced service is to be provided and a second period wherein substantially greater passenger-carrying service is to be provided by the elevator cars in a selected one of said directions than in the other of said directions, and modifying means responsive to operation of the selecting means to select the second period for modifying the control means to provide a substantially greater passenger-carrying service in said selected one of said directions than in the other of said directions.

28. In an elevator system for carrying passengers, a structure having a lower dispatching floor, a plurality of intermediate floors above the lower dispatching floor, and an upper dispatching floor about the intermediate floors, a plurality of elevator cars, means mounting the elevator cars for movement relative to the structure for serving the floors, motive means for moving the elevator cars relative to the structure, up-call means for registering calls for elevator car service from each of a plurality of floors of said structure in the up direction, down call means for registering calls for elevator car service from each of a plurality of the floors of said structure in the down direction, control means cooperating with the motive means and the call means in a first operation for stopping each of the elevator cars at each of the floors reached by each of the elevator cars during up travel thereof for which a call is registered by the up-call means and at each of the floors reached by each of the elevator cars during down travel thereof for which a call is registered by the down call means, upper dispatching means for dispatching elevator cars in succession from the upper dispatching floor, lower dispatching means for dispatching elevator cars in succession from the lower dispatching floor, the dispatching means and the control means cooperating to provide a first predetermined balanced service in the two directions of travel for said calls registered by the first call means and the second call means, said elevator cars during said balanced service being dispatched successively substantially at intervals from the lower dispatching floors for upward movement and said elevator cars during said balanced service being dispatched successively substantially at intervals from the upper dispatching floor for downward movement, selecting means automatically effective during the operation of the elevator system for selecting a first period wherein said substantially balanced service is to be provided and a second period wherein substantially greater passenger-carrying service is to be provided by the elevator cars in a selected one of said directions than in the other of said directions, and a third period wherein the balanced service is again to be provided, and modifying means responsive to operation of the selecting means to select the second period for modifying the control means to provide a substantially greater passenger-carrying service in said selected one of said directions than in the other of said directions, at least one of the elevator cars during said last-named service being conditioned when set for up travel to reverse substantially at the highest floor for which a call is registered by the down-call means provided that no call is registered by the up-call means for such highest floor and provided that no call for a floor above such highest floor is registered by the up-call means, said modifying means being responsive to selection by the selecting means of said third period for restoring the control means to provide substantially said balanced service.

29. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structures, and control means for controlling the movement of the elevator cars by the motive means and the stopping of the elevator cars at predetermined floors, said control means including call-registering means operable for registering calls for elevator service, dispatching means cooperating with the control means for successively selecting and starting elevator cars to be dispatched from each of said terminal floors, and transfer means cooperating with the control means in response to absence of a call registered by said call registering means for parking said elevator cars, said transfer means being responsive to the presence of call registration by the call-registering means for cooperating with the control means to start successively, a plurality of the parked elevator cars and to place the started elevator cars under the control of the dispatching means.

30. In a plural car elevator system for a structure having a plurality of floors including a first terminal floor, a second terminal floor, and a plurality of intermediate floors located between the terminal floors, motive means for moving each of the elevator cars relative to the structure, and control means for controlling the movement of the elevator cars by the motive means and the stopping of the elevator cars at predetermined floors, said control means comprising call registering means operable for registering a call for each of a plurality of the floors, dispatching means for dispatching available elevator cars from the first terminal floor at intervals, means effective in the absence of calls registered by the call registering means for parking said elevator cars at parking stations, means responsive to call registration by the call-registering means for dispatching a first one of the elevator cars from its parking station and starting measurement of an interval of time, and means responsive to a predetermined call registration at the end of the last-named interval for initiating movement of a second one of the elevator cars from its parking station.

31. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising call-registering means operable for registering a call for each of a plurality of the floors served by the elevator car, dispatching means effective when energized for successively selecting elevator cars to be dispatched from one of the floors, and energizing means responsive to the presence of a predetermined call registration by the call-registering means for energizing the dispatching means.

32. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of floors from which elevator service in a second direction towards the first terminal floor is desired, dispatching means effective when energized for successively selecting elevator cars to be dispatched from one of the floors, and means responsive to the call registration by any of said call registering means for energizing the dispatching means.

*33. In an elevator control system, in combination, a plurality of cars arranged to serve a plurality of floors, means for registering calls for service, means for each car for stopping the car at floors at which calls are registered, a sensing circuit comprising unilateral conducting devices corresponding to the path of the cars, a source of power having a first and a return lead, means for energizing the sensing circuit from the first lead at points corresponding to registered calls, said sensing circuit in response thereto conducting current in two directions for calls registered at floors intermediate the terminal floors, said two directions corresponding to both directions in which a car can travel from said intermediate floors, current responsive means connected to the sensing circuit and to the return lead arranged to shunt current from said circuit at points corresponding to the car positions, and car starting means actuated by said current responsive, means for starting said car in response to current shunted from said circuit.*

*34. In an elevator control system, in combination, a plurality of elevator cars arranged to serve a plurality of floors, means for registering calls for service, means for each car for stopping the car at floors at which calls are registered, a sensing circuit comprising unilateral conducting devices corresponding to the path of the elevator cars, energizing means having a first lead and a return lead, current limiting impedances connecting the first lead to the sensing circuit at points corresponding to registered calls, current responsive means for each car connecting the return lead to the sensing circuit at points corresponding to car positions, car starting means actuated by said current responsive means, and means for reversing the direction of travel of a car when the only current flowing in its current responsive means indicates a call requiring travel in the opposite direction.*

*35. In an elevator control system, in combination, a plurality of elevator cars arranged to serve a plurality of floors, means for moving the cars from floor to floor, means for registering calls for service, means for each car for stopping the car at floors at which calls are registered, a sensing circuit comprising unilateral conducting devices corresponding to the path of the elevator cars, current supply means having a first and a return lead, means including current limiting impedances connecting the first lead to the sensing circuit at points corresponding to registered calls, current responsive means connecting the return lead to the sensing circuit at points corresponding to the position of each car, car starting means connected to the current responsive means, said current responsive means including a portion responsive to current flow indicating more than a predetermined number of calls, and means cooperating with said portion arranged to momentarily interrupt the circuit through said portion whereby current flows through the current responsive means to start a next car.*

*36. In an elevator control system, in combination, a plurality of elevator cars arranged to serve a plurality of floors, means for moving the cars from floor to floor, means for registering calls for service, means for each car for stopping the car at floors at which calls are registered, a sensing circuit comprising unilateral conducting devices and corresponding to the path of the elevator cars, a current supply means having a first lead and a return lead, means including current limiting impedances for connecting the first lead to the sensing circuit at points corresponding to registered calls, current responsive means for each car connecting the return lead to the sensing circuit at points corresponding to the position of the car, relay means responsive to the presence of at least two cars at a lobby floor, said relay means preparing circuits for starting all but one of said cars at the lobby, and means for stopping said started car at an intermediate floor until a signal is registered requiring travel by such car.*

*37. An elevator control system according to claim 36 in which cars started from the lobby by the arrival of other cars travel to and stop at different floors in anticipation of hall calls from the various floors.*

*38. In an elevator system, in combination, at least three elevator cars arranged to serve a plurality of floors including a lobby floor, a terminal floor and a plurality of floors intermediate said lobby and terminal floors; means for moving each car from floor to floor; a control for each car setting its travel direction; means for automatically starting each car having its control set for travel toward the lobby floor; lobby means for automatically starting a car standing at the lobby floor in response to the arrival of another car at the lobby floor; means for stopping a car started by said automatically starting lobby means at a floor at which no other car is stopped; means for each of said floors for*

*registering hall calls for service by said cars at said floor; hall call transmitting means responsive to calls registered by said call registering means for certain floors for transmitting each said certain call to that car of said plurality of cars located at the floor most proximate said floor of said certain call; and means for starting only said most proximate car towards the floor of said certain call in response to said call transmission by said transmitter means.*

*39. A combination according to claim 38 wherein said car stopping means includes means for predetermining a plurality of parking floors each spaced from other parking floors by at least one floor which is not a parking floor.*

*40. An elevator system comprising at least three elevator cars serving a plurality of floors including a main floor, means for each of a plurality of said floors for registering a call for service at said floor; means for assigning registered calls to individual cars; means for moving each of said cars to said floors in response to calls for service for said floor assigned by said assigning means to said cars; means for maintaining a first car at a floor of said plurality of floors other than said main floor when all calls imposed on said system are assigned by said assigning means to other than said first car; means for maintaining a second car at a floor of said plurality of floors other than said main floor when all calls imposed on said system are assigned by said assigning means to other than said second car; means for each car for sensing passenger activity in said car; detecting means for each car each having a first condition when its respective car is at said main floor, each said detecting means having a second condition when its respective car is spaced from said main floor, and actuating means operating in response to all but one of said detecting means being in said second condition and to the sensing by said sensing means of passenger activity in said car whose detecting means is in said first condition for causing one of said first and second cars to run to said main floor.*

*41. An elevator system according to claim 40 including means for each car for registering car calls for service to each of a plurality of landings for passengers within said car; said sensing means being responsive to registration of a car call on said car call registering means for said car.*

*42. In an elevator control system, in combination, a plurality of cars arranged to serve a plurality of floors, means for registering calls for service, stopping control means for each car for stopping the car at floors at which calls are registered, a sensing circuit comprising a series chain of unilateral conducting devices corresponding to the path of the elevator cars, means supplying current to the junctions between the conducting devices, said junctions corresponding to floors having registered calls, direct current responsive means individual to each car and connected to the series chain at a position corresponding to the car position and direction of travel, each said stopping control means stopping its respective car for calls upon encountering the floors associated with said calls when current flows through said sensing circuit in one direction only, and means preventing a car's stopping control means from stopping its respective car for certain calls under conditions where current flows through a portion of said sensing circuit in a second direction opposite said first direction as well.*

*43. An elevator system comprising at least three elevator cars serving a plurality of floors distributed along the paths of travel of said cars, means for each of a plurality of floors for assigning registered calls to individual cars, means conditioning each car as an idle car in response to the absence of a call for service assigned to said car, means to maintain each of a plurality of said cars conditioned as idle cars by said conditioning means at floors other than a main floor, means to start a first idle car in response to a call for service assigned to said car, and means to start a second idle car in response to a predetermined call registration of calls assigned to said first idle car.*

* * * * *

UNITED STATES PATENT OFFICE

CERTIFICATE OF CORRECTION

PATENT NO. : RE 29,543

DATED : February 21, 1978

INVENTOR(S) : William Frank Glaser

It is certified that error appears in the above-identified patent and that said Letters Patent are hereby corrected as shown below:

| | |
|---|---|
| Col. 3, line 67 | "CO" should be --CC--. |
| Col. 4, line 17 | After "Lowest" change "land" to --landing--. |
| Col. 4, line 58 | Before across insert --"--. |
| Col. 4, line 61 | After "the" change "circuit" to read --circuits--. |
| Col. 5, line 24 | "LF" should read --MF--. |
| Col. 6, line 3 | After "button" change "NSB-7" to read --NSBa-7--. |
| Col. 6, line 9 | After "lanterns." change "SCa-7" to read --SGa-7--. |
| Col. 8, line 36 | After "CC2a-7," change "rectifer" to read --rectifier--. |

UNITED STATES PATENT OFFICE

CERTIFICATE OF CORRECTION

PATENT NO. : RE 29,543

DATED : February 21, 1978

INVENTOR(S) : William Frank Glaser

It is certified that error appears in the above-identified patent and that said Letters Patent are hereby corrected as shown below:

| | |
|---|---|
| Col. 11, line 58 | After "contacts" change "LRZa-7" to read --LR2a-7--. |
| Col. 12, line 8 | After "contact" change "HJCa-5" to read --HJC6a-5--. |
| Col. 13, line 49 | After "switch" change "N3a" to read --NSa--. |
| Col. 13, line 53 | After "that" insert --with--. |
| Col. 17, line 57 | After "contacts" change "WB1a-a" to read --WB1a-2--. |
| Col. 21, line 57 | After "and" change "WFC1-3" to read --MFC1-3--. |
| Col. 21, line 63 | After "contacts" change "MF3-a" to read --MF3a-3--. |

UNITED STATES PATENT OFFICE

CERTIFICATE OF CORRECTION

PATENT NO. : RE 29,543

DATED : February 21, 1978

INVENTOR(S) : William Frank Glaser

It is certified that error appears in the above-identified patent and that said Letters Patent are hereby corrected as shown below:

| | |
|---|---|
| Col. 22, line 13 | After "contacts" change "ABc-3" to read --AB3c-3--. |
| Col. 22, line 18 | Before "ABC2-3" change "contact" to read --contacts--. |
| Col. 25, line 64 | After "taken" change "car" to read --care--. |
| Col. 29, line 3 | Change "ACT1-8" to read --ACX1-8--. |

Signed and Sealed this

*Thirteenth* Day of *June 1978*

[SEAL]

*Attest:*

RUTH C. MASON
*Attesting Officer*

DONALD W. BANNER
*Commissioner of Patents and Trademarks*